US009569930B2

(12) United States Patent
Baerlocher et al.

(10) Patent No.: US 9,569,930 B2
(45) Date of Patent: *Feb. 14, 2017

(54) GAMING SYSTEM AND METHOD FOR PROVIDING AN ADDITIONAL GAMING CURRENCY

(71) Applicant: IGT, Las Vegas, NV (US)

(72) Inventors: Anthony J. Baerlocher, Henderson, NV (US); Alexander Casey Naglestad Cohen, Los Alamitos, CA (US); Arram Bekarian, Westleigh (AU); Daniel DeWaal, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,232

(22) Filed: Jul. 13, 2016

(65) Prior Publication Data

US 2016/0321873 A1 Nov. 3, 2016

Related U.S. Application Data

(63) Continuation of application No. 13/540,975, filed on Jul. 3, 2012, now Pat. No. 9,396,606, which is a (Continued)

(51) Int. Cl.
*A63F 9/24* (2006.01)
*A63F 13/00* (2014.01)
(Continued)

(52) U.S. Cl.
CPC ....... *G07F 17/3244* (2013.01); *G07F 17/3213* (2013.01); *G07F 17/3225* (2013.01); *G07F 17/34* (2013.01)

(58) Field of Classification Search
CPC .. G07F 17/34; G07F 17/3213; G07F 17/3225; G07F 17/3244
(Continued)

(56) References Cited

U.S. PATENT DOCUMENTS 2,068,379 A 1/1937 Frantz et al.
4,236,717 A 12/1980 Wichinsky
(Continued)

FOREIGN PATENT DOCUMENTS

AU 2007203506 8/2007
EP 0 813 132 12/1997
(Continued)

OTHER PUBLICATIONS

Auction Fever Advertisement, written by Sierre Design Group, available prior to 2004.
(Continued)

*Primary Examiner* — Omkar Deodhar
*Assistant Examiner* — Wei Lee
(74) *Attorney, Agent, or Firm* — Neal, Gerber & Eisenberg LLP

(57) ABSTRACT

A gaming system including a central server linked to a plurality of gaming machines. The gaming system includes a point or count based system to provide one or more awards to one or more players. Such points are accumulated by a player based on one or more events associated with the player's gaming experience. The points or counts utilized in the gaming system are selectively redeemed by the player in exchange for one or more opportunities to win an award. It should be appreciated that in one embodiment, the equalizing units disclosed herein are different, separate and independent from any monetary based points or credits, any promotional based points or credits, or any player tracking points.

37 Claims, 9 Drawing Sheets

Related U.S. Application Data continuation of application No. 13/102,582, filed on May 6, 2011, now Pat. No. 8,216,062, which is a continuation of application No. 11/830,626, filed on Jul. 30, 2007, now Pat. No. 7,985,133.

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |

(58) Field of Classification Search

USPC ........................................ 463/16, 20, 25, 42

See application file for complete search history.

(56) References Cited

U.S. PATENT DOCUMENTS

| | | | |
|---|---|---|---|
| 4,335,809 | A | 6/1982 | Wain |
| 4,572,509 | A | 2/1986 | Sitrick |
| 4,624,459 | A | 11/1986 | Kaufman |
| 4,652,998 | A | 3/1987 | Koza et al. |
| 4,695,053 | A | 9/1987 | Vazquez, Jr. et al. |
| 4,752,068 | A | 6/1988 | Endo |
| 4,842,278 | A | 6/1989 | Markowicz |
| 4,856,787 | A | 8/1989 | Itkis |
| 4,866,515 | A | 9/1989 | Tagawa et al. |
| 4,924,378 | A | 5/1990 | Hershey et al. |
| 4,926,327 | A | 5/1990 | Sidley |
| 5,078,405 | A | 1/1992 | Jones et al. |
| 5,085,435 | A | 2/1992 | Rossides |
| 5,138,712 | A | 8/1992 | Corbin |
| 5,142,622 | A | 8/1992 | Owens |
| 5,178,390 | A | 1/1993 | Okada |
| 5,179,517 | A | 1/1993 | Sarbin et al. |
| 5,265,874 | A | 11/1993 | Dickinson et al. |
| 5,275,400 | A | 1/1994 | Weingardt et al. |
| 5,276,312 | A | 1/1994 | McCarthy |
| 5,280,909 | A | 1/1994 | Tracy |
| 5,288,978 | A | 2/1994 | Iijima |
| 5,290,033 | A | 3/1994 | Bittner et al. |
| 5,305,195 | A | 4/1994 | Murphy |
| 5,326,104 | A | 7/1994 | Pease et al. |
| 5,342,047 | A | 8/1994 | Heidel et al. |
| 5,344,144 | A | 9/1994 | Canon |
| 5,349,642 | A | 9/1994 | Kingdon |
| 5,375,206 | A | 12/1994 | Hunter et al. |
| 5,377,993 | A | 1/1995 | Josephs |
| 5,404,567 | A | 4/1995 | DePietro et al. |
| 5,429,361 | A | 7/1995 | Raven et al. |
| 5,430,791 | A | 7/1995 | Feit et al. |
| 5,438,508 | A | 8/1995 | Wyman |
| 5,449,173 | A | 9/1995 | Thomas et al. |
| 5,470,079 | A | 11/1995 | LeStrange et al. |
| 5,472,196 | A | 12/1995 | Rusnak |
| 5,476,259 | A | 12/1995 | Weingardt |
| 5,499,340 | A | 3/1996 | Barritz |
| 5,507,491 | A | 4/1996 | Gatto et al. |
| 5,511,781 | A | 4/1996 | Wood et al. |
| 5,530,232 | A | 6/1996 | Taylor |
| 5,542,669 | A | 8/1996 | Charron et al. |
| 5,559,313 | A | 9/1996 | Claus et al. |
| 5,560,603 | A | 10/1996 | Seelig et al. |
| 5,564,700 | A | 10/1996 | Celona |
| 5,564,701 | A | 10/1996 | Dettor |
| 5,566,337 | A | 10/1996 | Szymanski et al. |
| 5,575,474 | A | 11/1996 | Rossides |
| 5,578,808 | A | 11/1996 | Taylor |
| 5,580,311 | A | 12/1996 | Haste, III |
| 5,584,485 | A | 12/1996 | Jones et al. |
| 5,586,257 | A | 12/1996 | Perlman |
| 5,586,937 | A | 12/1996 | Menashe |
| 5,609,525 | A | 3/1997 | Ohno et al. |
| 5,611,535 | A | 3/1997 | Tiberio |
| 5,617,331 | A | 4/1997 | Wakai et al. |
| 5,620,182 | A | 4/1997 | Rossides |
| 5,626,341 | A | 5/1997 | Jones et al. |
| 5,630,757 | A | 5/1997 | Gagin et al. |
| 5,639,088 | A | 6/1997 | Schneider et al. |
| 5,640,192 | A | 6/1997 | Garfinkle |
| 5,643,086 | A | 7/1997 | Alcorn et al. |
| 5,645,486 | A | 7/1997 | Nagao et al. |
| 5,649,118 | A | 7/1997 | Carlisle et al. |
| 5,655,603 | A | 8/1997 | Schulte et al. |
| 5,655,961 | A | 8/1997 | Acres et al. |
| 5,664,998 | A | 9/1997 | Seelig et al. |
| 5,671,412 | A | 9/1997 | Christiano |
| 5,695,402 | A | 12/1997 | Stupak |
| 5,702,304 | A | 12/1997 | Acres et al. |
| 5,708,709 | A | 1/1998 | Rose |
| 5,717,604 | A | 2/1998 | Wiggins |
| 5,741,183 | A | 4/1998 | Acres et al. |
| 5,745,879 | A | 4/1998 | Wyman |
| 5,749,784 | A | 5/1998 | Clapper, Jr. |
| 5,752,882 | A | 5/1998 | Acres et al. |
| 5,755,621 | A | 5/1998 | Marks et al. |
| 5,758,069 | A | 5/1998 | Olsen |
| 5,759,102 | A | 6/1998 | Pease et al. |
| 5,762,552 | A | 6/1998 | Vuong et al. |
| 5,766,076 | A | 6/1998 | Pease et al. |
| 5,768,382 | A | 6/1998 | Schneier et al. |
| 5,769,716 | A | 6/1998 | Saffari et al. |
| 5,772,509 | A | 6/1998 | Weiss |
| 5,779,545 | A | 7/1998 | Berg et al. |
| 5,779,547 | A | 7/1998 | SoRelle et al. |
| 5,779,549 | A | 7/1998 | Walker et al. |
| 5,800,268 | A | 9/1998 | Molnick |
| 5,806,855 | A | 9/1998 | Cherry |
| 5,816,918 | A | 10/1998 | Kelly et al. |
| 5,820,459 | A | 10/1998 | Acres et al. |
| 5,828,840 | A | 10/1998 | Cowan et al. |
| 5,830,063 | A | 11/1998 | Byrne |
| 5,833,537 | A | 11/1998 | Barric |
| 5,833,538 | A | 11/1998 | Weiss |
| 5,833,540 | A | 11/1998 | Miodunski et al. |
| 5,836,817 | A | 11/1998 | Acres et al. |
| 5,845,283 | A | 12/1998 | Williams et al. |
| 5,848,932 | A | 12/1998 | Adams |
| 5,851,011 | A | 12/1998 | Lott |
| 5,851,148 | A | 12/1998 | Brune et al. |
| 5,851,149 | A | 12/1998 | Xidos et al. |
| 5,855,515 | A | 1/1999 | Pease et al. |
| 5,871,398 | A | 2/1999 | Schneier et al. |
| 5,876,283 | A | 3/1999 | Parra et al. |
| 5,876,284 | A | 3/1999 | Acres et al. |
| 5,882,261 | A | 3/1999 | Adams |
| 5,885,158 | A | 3/1999 | Torango et al. |
| 5,890,963 | A | 4/1999 | Yen |
| 5,903,732 | A | 5/1999 | Reed et al. |
| 5,905,248 | A | 5/1999 | Russell et al. |
| 5,913,164 | A | 6/1999 | Pawa et al. |
| 5,917,725 | A | 6/1999 | Thacher et al. |
| 5,918,039 | A | 6/1999 | Buswell et al. |
| 5,925,127 | A | 7/1999 | Ahmad |
| 5,941,773 | A | 8/1999 | Harlick |
| 5,947,820 | A | 9/1999 | Morro et al. |
| 5,947,822 | A | 9/1999 | Weiss |
| 5,951,011 | A | 9/1999 | Potter et al. |
| 5,951,611 | A | 9/1999 | La Pierre |
| 5,957,775 | A | 9/1999 | Cherry |
| 5,967,896 | A | 10/1999 | Jorasch et al. |
| 5,971,271 | A | 10/1999 | Wynn et al. |
| 5,971,849 | A | 10/1999 | Falciglia |
| 5,974,409 | A | 10/1999 | Sanu et al. |
| 5,980,093 | A | 11/1999 | Jones et al. |
| 5,980,384 | A | 11/1999 | Barrie |
| 5,983,190 | A | 11/1999 | Trower, II et al. |
| 5,991,760 | A | 11/1999 | Gauvin et al. |
| 5,991,790 | A | 11/1999 | Shah et al. |
| 5,996,068 | A | 11/1999 | Dwyer, III et al. |
| 5,997,002 | A | 12/1999 | Goldman |
| 5,997,400 | A | 12/1999 | Seelig et al. |
| 5,997,401 | A | 12/1999 | Crawford |

(56) References Cited

U.S. PATENT DOCUMENTS

| | | | |
|---|---|---|---|
| 5,999,808 | A | 12/1999 | La Due |
| 6,001,016 | A | 12/1999 | Walker et al. |
| 6,003,066 | A | 12/1999 | Ryan et al. |
| 6,003,094 | A | 12/1999 | Dean |
| 6,003,123 | A | 12/1999 | Carter et al. |
| 6,004,207 | A | 12/1999 | Wilson, Jr. et al. |
| 6,004,211 | A | 12/1999 | Brenner et al. |
| 6,011,850 | A | 1/2000 | Bertrand et al. |
| 6,012,045 | A | 1/2000 | Barzilai |
| 6,012,832 | A | 1/2000 | Saunders et al. |
| 6,012,983 | A | 1/2000 | Walker et al. |
| 6,015,344 | A | 1/2000 | Kelly et al. |
| 6,024,640 | A | 2/2000 | Walker et al. |
| 6,048,269 | A | 4/2000 | Burns et al. |
| 6,056,289 | A | 5/2000 | Clapper, Jr. |
| 6,059,289 | A | 5/2000 | Vancura |
| 6,065,752 | A | 5/2000 | Beltran et al. |
| 6,068,552 | A | 5/2000 | Walker et al. |
| 6,068,553 | A | 5/2000 | Parker |
| 6,068,982 | A | 5/2000 | Rolfe et al. |
| 6,071,190 | A | 6/2000 | Weiss et al. |
| 6,077,162 | A | 6/2000 | Weiss |
| 6,077,163 | A | 6/2000 | Walker et al. |
| 6,085,247 | A | 7/2000 | Parsons, Jr. et al. |
| 6,089,975 | A | 7/2000 | Dunn |
| 6,089,977 | A | 7/2000 | Bennett |
| 6,089,980 | A | 7/2000 | Gauselmann |
| 6,089,982 | A | 7/2000 | Holch et al. |
| 6,099,408 | A | 8/2000 | Schneier et al. |
| 6,106,396 | A | 8/2000 | Alcorn et al. |
| 6,108,420 | A | 8/2000 | Larose et al. |
| 6,110,041 | A | 8/2000 | Walker et al. |
| 6,113,098 | A | 9/2000 | Adams |
| 6,113,495 | A | 9/2000 | Walker et al. |
| 6,117,013 | A | 9/2000 | Eiba |
| 6,126,542 | A | 10/2000 | Fier |
| 6,135,884 | A | 10/2000 | Hendrick et al. |
| 6,135,887 | A | 10/2000 | Pease et al. |
| 6,141,737 | A | 10/2000 | Krantz et al. |
| 6,142,872 | A | 11/2000 | Walker et al. |
| 6,149,522 | A | 11/2000 | Alcorn et al. |
| 6,151,707 | A | 11/2000 | Hecksel et al. |
| 6,155,925 | A | 12/2000 | Giobbi et al. |
| 6,159,098 | A | 12/2000 | Slomiany et al. |
| 6,162,122 | A | 12/2000 | Acres et al. |
| 6,165,071 | A | 12/2000 | Weiss |
| 6,179,710 | B1 | 1/2001 | Sawyer et al. |
| 6,183,362 | B1 | 2/2001 | Boushy |
| 6,190,255 | B1 | 2/2001 | Thomas et al. |
| 6,206,782 | B1 | 3/2001 | Walker et al. |
| 6,210,275 | B1 | 4/2001 | Olsen |
| 6,217,448 | B1 | 4/2001 | Olsen |
| 6,219,836 | B1 | 4/2001 | Wells et al. |
| 6,224,482 | B1 | 5/2001 | Bennett |
| 6,224,486 | B1 | 5/2001 | Walker et al. |
| 6,227,972 | B1 | 5/2001 | Walker et al. |
| 6,231,445 | B1 | 5/2001 | Acres |
| 6,234,896 | B1 | 5/2001 | Walker et al. |
| 6,241,608 | B1 | 6/2001 | Torango |
| 6,244,958 | B1 | 6/2001 | Acres |
| 6,251,014 | B1 | 6/2001 | Stockdale et al. |
| 6,254,481 | B1 | 7/2001 | Jaffe |
| 6,254,483 | B1 | 7/2001 | Acres |
| 6,257,981 | B1 | 7/2001 | Acres et al. |
| 6,264,561 | B1 | 7/2001 | Saffari et al. |
| 6,267,671 | B1 | 7/2001 | Hogan |
| 6,270,412 | B1 | 8/2001 | Crawford et al. |
| 6,273,820 | B1 | 8/2001 | Haste, III |
| 6,287,200 | B1 | 9/2001 | Sharma |
| 6,287,202 | B1 | 9/2001 | Pascal et al. |
| 6,293,866 | B1 | 9/2001 | Walker et al. |
| 6,296,569 | B1 | 10/2001 | Congello |
| 6,302,790 | B1 | 10/2001 | Brossard |
| 6,302,793 | B1 | 10/2001 | Fertitta, III et al. |
| 6,304,905 | B1 | 10/2001 | Clark |
| 6,308,271 | B2 | 10/2001 | Tanaka |
| 6,311,976 | B1 | 11/2001 | Yoseloff et al. |
| 6,312,332 | B1 | 11/2001 | Walker et al. |
| 6,312,333 | B1 | 11/2001 | Acres |
| 6,319,119 | B1 | 11/2001 | Konoe et al. |
| 6,319,122 | B1 | 11/2001 | Packes, Jr. et al. |
| 6,319,125 | B1 | 11/2001 | Acres |
| 6,319,127 | B1 | 11/2001 | Walker et al. |
| 6,328,649 | B1 | 12/2001 | Randall et al. |
| 6,336,862 | B1 | 1/2002 | Byrne |
| 6,345,386 | B1 | 2/2002 | Delo et al. |
| 6,353,928 | B1 | 3/2002 | Altberg et al. |
| 6,354,946 | B1 | 3/2002 | Finn |
| 6,358,147 | B1 | 3/2002 | Jaffe et al. |
| 6,358,150 | B1 | 3/2002 | Mir et al. |
| 6,361,437 | B1 | 3/2002 | Walker et al. |
| 6,361,441 | B1 | 3/2002 | Walker et al. |
| 6,364,314 | B1 | 4/2002 | Canterbury |
| 6,364,765 | B1 | 4/2002 | Walker et al. |
| 6,364,766 | B1 | 4/2002 | Anderson et al. |
| 6,364,768 | B1 | 4/2002 | Acres et al. |
| 6,365,765 | B1 | 4/2002 | Baldwin et al. |
| 6,368,216 | B1 | 4/2002 | Hedrick et al. |
| 6,371,852 | B1 | 4/2002 | Acres |
| 6,375,567 | B1 | 4/2002 | Acres |
| 6,375,568 | B1 | 4/2002 | Roffman et al. |
| 6,375,569 | B1 | 4/2002 | Acres |
| 6,379,248 | B1 | 4/2002 | Jorasch et al. |
| 6,383,074 | B1 | 5/2002 | Boggs |
| 6,389,538 | B1 | 5/2002 | Gruse et al. |
| 6,389,589 | B1 | 5/2002 | Mishra et al. |
| 6,394,907 | B1 | 5/2002 | Rowe |
| 6,397,381 | B1 | 5/2002 | Delo et al. |
| 6,398,643 | B1 | 6/2002 | Knowles et al. |
| 6,402,614 | B1 | 6/2002 | Schneier et al. |
| 6,409,602 | B1 | 6/2002 | Wiltshire et al. |
| 6,418,554 | B1 | 7/2002 | Delo et al. |
| 6,422,940 | B1 | 7/2002 | Walker et al. |
| 6,425,828 | B2 | 7/2002 | Walker et al. |
| 6,427,227 | B1 | 7/2002 | Chamberlain |
| 6,431,983 | B2 | 8/2002 | Acres |
| 6,435,511 | B1 | 8/2002 | Vancura et al. |
| 6,439,996 | B2 | 8/2002 | LeMay et al. |
| 6,442,529 | B1 | 8/2002 | Krishan et al. |
| 6,443,452 | B1 | 9/2002 | Brune |
| 6,443,839 | B2 | 9/2002 | Stockdale et al. |
| 6,450,887 | B1 | 9/2002 | Mir et al. |
| 6,457,175 | B1 | 9/2002 | Lerche |
| RE37,885 | E | 10/2002 | Acres et al. |
| 6,461,241 | B1 | 10/2002 | Webb et al. |
| 6,464,581 | B1 | 10/2002 | Yoseloff et al. |
| 6,485,367 | B1 | 11/2002 | Joshi |
| 6,488,585 | B1 | 12/2002 | Wells et al. |
| 6,503,146 | B2 | 1/2003 | Walker et al. |
| 6,506,117 | B2 | 1/2003 | DeMar |
| 6,506,118 | B1 | 1/2003 | Baerlocher et al. |
| 6,508,710 | B1 | 1/2003 | Paravia et al. |
| 6,523,166 | B1 | 2/2003 | Mishra et al. |
| 6,527,638 | B1 | 3/2003 | Walker et al. |
| 6,532,543 | B1 | 3/2003 | Smith et al. |
| 6,533,273 | B2 | 3/2003 | Cole et al. |
| 6,533,664 | B1 | 3/2003 | Crumby |
| 6,558,255 | B2 | 5/2003 | Walker et al. |
| 6,565,434 | B1 | 5/2003 | Acres |
| 6,575,832 | B1 | 6/2003 | Manfredi et al. |
| 6,578,199 | B1 | 6/2003 | Tsou et al. |
| 6,592,457 | B1 | 7/2003 | Frohm et al. |
| 6,592,459 | B2 | 7/2003 | Parra et al. |
| 6,592,460 | B2 | 7/2003 | Torango |
| 6,595,856 | B1 | 7/2003 | Ginsburg et al. |
| 6,607,438 | B2 | 8/2003 | Baerlocher et al. |
| 6,607,439 | B2 | 8/2003 | Schneier et al. |
| 6,607,441 | B1 | 8/2003 | Acres |
| 6,609,978 | B1 | 8/2003 | Paulsen |
| 6,612,574 | B1 | 9/2003 | Cole et al. |
| 6,612,575 | B1 | 9/2003 | Cole et al. |
| 6,620,046 | B2 | 9/2003 | Rowe |
| 6,620,047 | B1 | 9/2003 | Alcorn et al. |
| 6,626,758 | B1 | 9/2003 | Parham et al. |

(56) References Cited

U.S. PATENT DOCUMENTS

| | | | |
|---|---|---|---|
| 6,628,939 | B2 | 9/2003 | Paulsen |
| 6,632,141 | B2 | 10/2003 | Webb et al. |
| 6,638,164 | B2 | 10/2003 | Randall et al. |
| 6,638,167 | B1 | 10/2003 | Sawyer et al. |
| 6,638,170 | B1 | 10/2003 | Crumby |
| 6,645,077 | B2 | 11/2003 | Rowe |
| 6,648,753 | B1 | 11/2003 | Tracy et al. |
| 6,652,378 | B2 | 11/2003 | Cannon et al. |
| 6,656,046 | B1 | 12/2003 | Yoseloff et al. |
| 6,656,047 | B1 | 12/2003 | Tarantino et al. |
| 6,656,048 | B2 | 12/2003 | Olsen |
| 6,663,489 | B2 | 12/2003 | Baerlocher |
| 6,676,512 | B2 | 1/2004 | Fong et al. |
| 6,682,423 | B2 | 1/2004 | Brosnan et al. |
| 6,685,567 | B2 | 2/2004 | Cockerille et al. |
| 6,692,354 | B2 | 2/2004 | Tracy et al. |
| 6,692,355 | B2 | 2/2004 | Baerlocher et al. |
| 6,699,124 | B2 | 3/2004 | Suchocki |
| 6,709,330 | B1 | 3/2004 | Klein et al. |
| 6,712,697 | B2 | 3/2004 | Acres |
| 6,712,699 | B2 | 3/2004 | Walker et al. |
| 6,712,702 | B2 | 3/2004 | Goldberg et al. |
| 6,722,981 | B2 | 4/2004 | Kaminkow |
| 6,722,985 | B2 | 4/2004 | Criss-Puszkiewicz et al. |
| 6,722,986 | B1 | 4/2004 | Lyons et al. |
| 6,726,563 | B1 | 4/2004 | Baerlocher et al. |
| 6,729,957 | B2 | 5/2004 | Burns et al. |
| 6,729,958 | B2 | 5/2004 | Burns et al. |
| 6,733,390 | B2 | 5/2004 | Walker et al. |
| 6,736,725 | B2 | 5/2004 | Burns et al. |
| 6,739,973 | B1 | 5/2004 | Lucchesi et al. |
| 6,745,236 | B1 | 6/2004 | Hawkins et al. |
| 6,746,327 | B2 | 6/2004 | Frohm et al. |
| 6,749,510 | B2 | 6/2004 | Giobbi |
| 6,755,742 | B1 | 6/2004 | Hartman et al. |
| 6,758,748 | B2 | 7/2004 | Byrne |
| 6,758,757 | B2 | 7/2004 | Luciano, Jr. et al. |
| 6,776,711 | B1 | 8/2004 | Baerlocher |
| 6,776,713 | B2 | 8/2004 | Gauselmann |
| 6,780,111 | B2 | 8/2004 | Cannon et al. |
| 6,782,477 | B2 | 8/2004 | McCarroll |
| 6,790,142 | B2 | 9/2004 | Okada et al. |
| 6,790,143 | B2 | 9/2004 | Crumby |
| 6,793,578 | B2 | 9/2004 | Luccessi et al. |
| 6,800,027 | B2 | 10/2004 | Giobbi et al. |
| 6,800,030 | B2 | 10/2004 | Acres |
| 6,802,774 | B1 | 10/2004 | Carlson et al. |
| 6,802,778 | B1 | 10/2004 | LeMay et al. |
| 6,804,763 | B1 | 10/2004 | Stockdale et al. |
| 6,805,349 | B2 | 10/2004 | Baerlocher et al. |
| 6,805,634 | B1 | 10/2004 | Wells et al. |
| 6,811,486 | B1 | 11/2004 | Luciano, Jr. |
| 6,811,488 | B2 | 11/2004 | Paravia et al. |
| 6,813,765 | B1 | 11/2004 | Flores |
| 6,814,664 | B2 | 11/2004 | Baerlocher et al. |
| 6,816,882 | B1 | 11/2004 | Conner et al. |
| 6,823,456 | B1 | 11/2004 | Dan et al. |
| 6,824,465 | B2 | 11/2004 | Luciano, Jr. |
| 6,830,515 | B2 | 12/2004 | Rowe |
| 6,832,958 | B2 | 12/2004 | Acres et al. |
| 6,834,245 | B2 | 12/2004 | Ota et al. |
| 6,835,132 | B2 | 12/2004 | Bennett |
| 6,836,794 | B1 | 12/2004 | Lucovsky et al. |
| 6,837,788 | B2 | 1/2005 | Cannon |
| 6,843,723 | B2 | 1/2005 | Joshi |
| 6,843,725 | B2 | 1/2005 | Nelson |
| 6,846,238 | B2 | 1/2005 | Wells |
| 6,848,995 | B1 | 2/2005 | Walker et al. |
| 6,852,031 | B1 | 2/2005 | Rowe |
| 6,855,054 | B2 | 2/2005 | White et al. |
| 6,855,057 | B2 | 2/2005 | Namba et al. |
| 6,857,958 | B2 | 2/2005 | Osawa |
| 6,857,959 | B1 | 2/2005 | Nguyen |
| 6,863,608 | B1 | 3/2005 | LeMay et al. |
| 6,866,581 | B2 | 3/2005 | Martinek et al. |
| 6,866,584 | B2 | 3/2005 | Michaelson |
| 6,866,586 | B2 | 3/2005 | Oberberger et al. |
| 6,869,076 | B1 | 3/2005 | Moore et al. |
| 6,869,360 | B2 | 3/2005 | Marks et al. |
| 6,869,361 | B2 | 3/2005 | Sharpless et al. |
| 6,875,106 | B2 | 4/2005 | Weiss et al. |
| 6,875,109 | B2 | 4/2005 | Stockdale |
| 6,875,110 | B1 | 4/2005 | Crumby |
| 6,878,063 | B2 | 4/2005 | Manfredi et al. |
| 6,884,162 | B2 | 4/2005 | Raverdy et al. |
| 6,884,166 | B2 | 4/2005 | Leen et al. |
| 6,884,170 | B2 | 4/2005 | Rowe |
| 6,884,171 | B2 | 4/2005 | Eck et al. |
| 6,884,173 | B2 | 4/2005 | Gauselmann |
| 6,884,174 | B2 | 4/2005 | Lundy et al. |
| 6,887,151 | B2 | 5/2005 | Leen et al. |
| 6,887,154 | B1 | 5/2005 | Luciano, Jr. et al. |
| 6,887,156 | B2 | 5/2005 | DeWeese et al. |
| 6,889,159 | B2 | 5/2005 | Klotz et al. |
| 6,890,256 | B2 | 5/2005 | Walker et al. |
| 6,892,182 | B1 | 5/2005 | Rowe et al. |
| 6,896,616 | B2 | 5/2005 | Weiss |
| 6,896,618 | B2 | 5/2005 | Benoy et al. |
| 6,899,627 | B2 | 5/2005 | Lam et al. |
| 6,899,628 | B2 | 5/2005 | Leen et al. |
| 6,901,375 | B2 | 5/2005 | Fernandez |
| 6,902,481 | B2 | 6/2005 | Breckner et al. |
| 6,905,406 | B2 | 6/2005 | Kaminkow et al. |
| 6,905,411 | B2 | 6/2005 | Nguyen et al. |
| 6,908,391 | B2 | 6/2005 | Gatto et al. |
| 6,910,964 | B2 | 6/2005 | Acres |
| 6,910,965 | B2 | 6/2005 | Downes |
| 6,923,721 | B2 | 8/2005 | Luciano et al. |
| 6,939,234 | B2 | 9/2005 | Beatty |
| 6,942,571 | B1 | 9/2005 | McAllister et al. |
| 6,945,870 | B2 | 9/2005 | Gatto et al. |
| RE38,812 | E | 10/2005 | Acres et al. |
| 6,955,600 | B2 | 10/2005 | Glavich et al. |
| 6,969,319 | B2 | 11/2005 | Rowe et al. |
| 6,971,954 | B2 | 12/2005 | Randall et al. |
| 6,991,544 | B2 | 1/2006 | Soltys et al. |
| 6,997,807 | B2 | 2/2006 | Weiss |
| 7,008,321 | B2 | 3/2006 | Rowe et al. |
| 7,011,581 | B2 | 3/2006 | Cole et al. |
| 7,018,292 | B2 | 3/2006 | Tracy et al. |
| 7,025,674 | B2 | 4/2006 | Adams et al. |
| 7,037,191 | B2 | 5/2006 | Rodgers et al. |
| 7,040,982 | B1 | 5/2006 | Jarvis et al. |
| 7,040,985 | B2 | 5/2006 | Vancura |
| 7,051,004 | B2 | 5/2006 | Nuttal et al. |
| 7,056,215 | B1 | 6/2006 | Olive |
| 7,063,617 | B2 | 6/2006 | Brosnan et al. |
| 7,066,814 | B2 | 6/2006 | Glavich et al. |
| 7,070,501 | B2 | 7/2006 | Cormack et al. |
| 7,070,503 | B2 | 7/2006 | Rudolph |
| 7,074,127 | B2 | 7/2006 | Cuddy et al. |
| 7,077,746 | B2 | 7/2006 | Torango |
| 7,081,050 | B2 | 7/2006 | Tarantino |
| 7,094,149 | B2 | 8/2006 | Walker et al. |
| 7,121,942 | B2 | 10/2006 | Baerlocher et al. |
| 7,169,041 | B2 | 1/2007 | Tessmer et al. |
| 7,182,690 | B2 | 2/2007 | Giobbi et al. |
| 7,223,172 | B2 | 5/2007 | Baerlocher et al. |
| 7,291,068 | B2 | 11/2007 | Bryant et al. |
| 7,318,774 | B2 | 1/2008 | Bryant et al. |
| 2001/0024971 | A1 | 9/2001 | Brossard |
| 2001/0036857 | A1 | 11/2001 | Mothwurf et al. |
| 2001/0044337 | A1 | 11/2001 | Rowe et al. |
| 2001/0046893 | A1 | 11/2001 | Giobbi et al. |
| 2001/0055990 | A1 | 12/2001 | Acres |
| 2002/0014821 | A1 | 2/2002 | Kobayashi et al. |
| 2002/0028708 | A1 | 3/2002 | Busch et al. |
| 2002/0032049 | A1 | 3/2002 | Walker et al. |
| 2002/0034977 | A1 | 3/2002 | Burns et al. |
| 2002/0039919 | A1 | 4/2002 | Joshi et al. |
| 2002/0045473 | A1 | 4/2002 | Walker et al. |
| 2002/0045484 | A1 | 4/2002 | Eck et al. |
| 2002/0057800 | A1 | 5/2002 | Gordon et al. |
| 2002/0058546 | A2 | 5/2002 | Acres |

(56) References Cited

U.S. PATENT DOCUMENTS

| | | | |
|---|---|---|---|
| 2002/0068629 | A1 | 6/2002 | Allen et al. |
| 2002/0068631 | A1 | 6/2002 | Raverdy et al. |
| 2002/0071557 | A1 | 6/2002 | Nguyen |
| 2002/0071560 | A1 | 6/2002 | Kurn et al. |
| 2002/0077173 | A1 | 6/2002 | Luciano, Jr. et al. |
| 2002/0077174 | A1 | 6/2002 | Luciano et al. |
| 2002/0080969 | A1 | 6/2002 | Giobbi |
| 2002/0093136 | A1 | 7/2002 | Moody |
| 2002/0094871 | A1 | 7/2002 | Luciano, Jr. et al. |
| 2002/0107065 | A1 | 8/2002 | Rowe |
| 2002/0116615 | A1 | 8/2002 | Nguyen et al. |
| 2002/0132660 | A1 | 9/2002 | Taylor |
| 2002/0137217 | A1 | 9/2002 | Rowe |
| 2002/0138594 | A1 | 9/2002 | Rowe |
| 2002/0142846 | A1 | 10/2002 | Paulsen |
| 2002/0144116 | A1 | 10/2002 | Giobbi |
| 2002/0151342 | A1 | 10/2002 | Tracy et al. |
| 2002/0151349 | A1 | 10/2002 | Joshi |
| 2002/0151356 | A1 | 10/2002 | Burns et al. |
| 2002/0151360 | A1 | 10/2002 | Durham et al. |
| 2002/0160826 | A1 | 10/2002 | Gomez et al. |
| 2002/0169022 | A1 | 11/2002 | Canterbury |
| 2002/0173355 | A1 | 11/2002 | Walker et al. |
| 2002/0174160 | A1 | 11/2002 | Gatto et al. |
| 2002/0174444 | A1 | 11/2002 | Gatto et al. |
| 2002/0177483 | A1 | 11/2002 | Cannon |
| 2002/0183105 | A1 | 12/2002 | Cannon et al. |
| 2002/0183109 | A1 | 12/2002 | McGahn et al. |
| 2002/0188940 | A1 | 12/2002 | Breckner et al. |
| 2002/0196342 | A1 | 12/2002 | Walker et al. |
| 2003/0013515 | A1 | 1/2003 | Rowe et al. |
| 2003/0013531 | A1 | 1/2003 | Rowe et al. |
| 2003/0027625 | A1 | 2/2003 | Rowe |
| 2003/0027638 | A1 | 2/2003 | Schneider et al. |
| 2003/0032474 | A1 | 2/2003 | Kaminkow |
| 2003/0036422 | A1 | 2/2003 | Baerlocher et al. |
| 2003/0036427 | A1 | 2/2003 | Brandstetter et al. |
| 2003/0045350 | A1 | 3/2003 | Baerlocher et al. |
| 2003/0045351 | A1 | 3/2003 | Gauselmann |
| 2003/0045354 | A1 | 3/2003 | Giobbi |
| 2003/0054879 | A1 | 3/2003 | Schneier et al. |
| 2003/0060259 | A1 | 3/2003 | Mierau et al. |
| 2003/0060266 | A1 | 3/2003 | Baerlocher |
| 2003/0060279 | A1 | 3/2003 | Torango |
| 2003/0060286 | A1 | 3/2003 | Walker et al. |
| 2003/0064771 | A1 | 4/2003 | Morrow et al. |
| 2003/0064794 | A1 | 4/2003 | Mead et al. |
| 2003/0064807 | A1 | 4/2003 | Walker et al. |
| 2003/0064810 | A1 | 4/2003 | Okada |
| 2003/0069058 | A1 | 4/2003 | Byrne et al. |
| 2003/0073497 | A1 | 4/2003 | Nelson |
| 2003/0078094 | A1 | 4/2003 | Gatto et al. |
| 2003/0078101 | A1 | 4/2003 | Schneider et al. |
| 2003/0083943 | A1 | 5/2003 | Adams et al. |
| 2003/0090063 | A1 | 5/2003 | Jarvis et al. |
| 2003/0092484 | A1 | 5/2003 | Schneider et al. |
| 2003/0092489 | A1 | 5/2003 | Veradej |
| 2003/0093669 | A1 | 5/2003 | Morais et al. |
| 2003/0100359 | A1 | 5/2003 | Loose et al. |
| 2003/0100362 | A1 | 5/2003 | Horniak et al. |
| 2003/0100369 | A1 | 5/2003 | Gatto et al. |
| 2003/0100370 | A1 | 5/2003 | Gatto et al. |
| 2003/0100371 | A1 | 5/2003 | Gatto et al. |
| 2003/0100372 | A1 | 5/2003 | Gatto et al. |
| 2003/0106769 | A1 | 6/2003 | Weiss |
| 2003/0114219 | A1 | 6/2003 | McClintic |
| 2003/0115351 | A1 | 6/2003 | Giobbi |
| 2003/0119579 | A1 | 6/2003 | Walker et al. |
| 2003/0140134 | A1 | 7/2003 | Swanson et al. |
| 2003/0144965 | A1 | 7/2003 | Prasad et al. |
| 2003/0157979 | A1 | 8/2003 | Cannon et al. |
| 2003/0162589 | A1 | 8/2003 | Nguyen et al. |
| 2003/0171145 | A1 | 9/2003 | Rowe |
| 2003/0171149 | A1 | 9/2003 | Rothschild |
| 2003/0176219 | A1 | 9/2003 | Manfredi et al. |
| 2003/0181231 | A1 | 9/2003 | Vancura et al. |
| 2003/0186733 | A1 | 10/2003 | Wolf et al. |
| 2003/0188306 | A1 | 10/2003 | Harris et al. |
| 2003/0190941 | A1 | 10/2003 | Byrne |
| 2003/0195024 | A1 | 10/2003 | Slattery |
| 2003/0195033 | A1 | 10/2003 | Gazdic et al. |
| 2003/0211880 | A1 | 11/2003 | Locke |
| 2003/0211881 | A1 | 11/2003 | Walker et al. |
| 2003/0212597 | A1 | 11/2003 | Ollins |
| 2003/0216182 | A1 | 11/2003 | Gauselmann |
| 2003/0222402 | A1 | 12/2003 | Olive |
| 2003/0224852 | A1 | 12/2003 | Walker et al. |
| 2003/0228904 | A1 | 12/2003 | Acres et al. |
| 2003/0228907 | A1 | 12/2003 | Gatto et al. |
| 2003/0228912 | A1 | 12/2003 | Wells et al. |
| 2003/0232650 | A1 | 12/2003 | Beatty |
| 2003/0236116 | A1 | 12/2003 | Marks et al. |
| 2004/0002379 | A1 | 1/2004 | Parrott et al. |
| 2004/0002381 | A1 | 1/2004 | Alcorn et al. |
| 2004/0002385 | A1 | 1/2004 | Nguyen |
| 2004/0003389 | A1 | 1/2004 | Reynar et al. |
| 2004/0005919 | A1 | 1/2004 | Walker et al. |
| 2004/0009811 | A1 | 1/2004 | Torango |
| 2004/0010700 | A1 | 1/2004 | Mont |
| 2004/0015423 | A1 | 1/2004 | Walker et al. |
| 2004/0023721 | A1 | 2/2004 | Giobbi |
| 2004/0024666 | A1 | 2/2004 | Walker et al. |
| 2004/0029631 | A1 | 2/2004 | Duhamel |
| 2004/0029635 | A1 | 2/2004 | Giobbi |
| 2004/0033831 | A1 | 2/2004 | Tarantino |
| 2004/0038723 | A1 | 2/2004 | Schneier et al. |
| 2004/0048650 | A1 | 3/2004 | Mierau et al. |
| 2004/0048660 | A1 | 3/2004 | Gentles et al. |
| 2004/0048667 | A1 | 3/2004 | Rowe |
| 2004/0053664 | A1 | 3/2004 | Byrne |
| 2004/0053680 | A1 | 3/2004 | Schultz |
| 2004/0054952 | A1 | 3/2004 | Morrow et al. |
| 2004/0063489 | A1 | 4/2004 | Crumby |
| 2004/0072604 | A1 | 4/2004 | Toyoda |
| 2004/0072608 | A1 | 4/2004 | Toyoda |
| 2004/0072615 | A1 | 4/2004 | Maya et al. |
| 2004/0082373 | A1 | 4/2004 | Cole et al. |
| 2004/0082385 | A1 | 4/2004 | Silva et al. |
| 2004/0092310 | A1 | 5/2004 | Brosnan et al. |
| 2004/0097280 | A1 | 5/2004 | Gauselmann |
| 2004/0098597 | A1 | 5/2004 | Giobbi |
| 2004/0102238 | A1 | 5/2004 | Taylor |
| 2004/0106448 | A1 | 6/2004 | Gauselmann |
| 2004/0106452 | A1 | 6/2004 | Nguyen et al. |
| 2004/0110557 | A1 | 6/2004 | Rowe |
| 2004/0124243 | A1 | 7/2004 | Gatto et al. |
| 2004/0127279 | A1 | 7/2004 | Gatto et al. |
| 2004/0132532 | A1 | 7/2004 | Brosnan et al. |
| 2004/0133485 | A1 | 7/2004 | Schoonmaker et al. |
| 2004/0142739 | A1 | 7/2004 | Loose et al. |
| 2004/0142742 | A1 | 7/2004 | Schneider et al. |
| 2004/0152509 | A1 | 8/2004 | Hornik et al. |
| 2004/0162144 | A1 | 8/2004 | Loose et al. |
| 2004/0166923 | A1 | 8/2004 | Michaelson et al. |
| 2004/0166931 | A1 | 8/2004 | Criss-Puszkiewicz et al. |
| 2004/0166940 | A1 | 8/2004 | Rothschild |
| 2004/0166942 | A1 | 8/2004 | Muir |
| 2004/0176162 | A1 | 9/2004 | Rothschild |
| 2004/0176167 | A1 | 9/2004 | Michaelson et al. |
| 2004/0179701 | A1 | 9/2004 | Boyd |
| 2004/0180721 | A1 | 9/2004 | Rowe |
| 2004/0180722 | A1 | 9/2004 | Giobbi |
| 2004/0185936 | A1 | 9/2004 | Block et al. |
| 2004/0193726 | A1 | 9/2004 | Gatto et al. |
| 2004/0198494 | A1 | 10/2004 | Nguyen et al. |
| 2004/0198496 | A1 | 10/2004 | Gatto et al. |
| 2004/0204244 | A1 | 10/2004 | Rathsack et al. |
| 2004/0209662 | A1 | 10/2004 | Wadleigh |
| 2004/0214622 | A1 | 10/2004 | Atkinson |
| 2004/0214627 | A1 | 10/2004 | Jordan et al. |
| 2004/0214640 | A1 | 10/2004 | Giobbi |
| 2004/0214641 | A1 | 10/2004 | Giobbi |
| 2004/0215756 | A1 | 10/2004 | VanAntwerp et al. |
| 2004/0219967 | A1 | 11/2004 | Giobbi et al. |

(56) References Cited

U.S. PATENT DOCUMENTS

| | | | |
|---|---|---|---|
| 2004/0219983 | A1 | 11/2004 | Giobbi |
| 2004/0224770 | A1 | 11/2004 | Wolf et al. |
| 2004/0229684 | A1 | 11/2004 | Blackburn et al. |
| 2004/0229698 | A1 | 11/2004 | Lind et al. |
| 2004/0229699 | A1 | 11/2004 | Gentles et al. |
| 2004/0235552 | A1 | 11/2004 | Gauselmann |
| 2004/0235559 | A1 | 11/2004 | Brosnan et al. |
| 2004/0235563 | A1 | 11/2004 | Blackburn et al. |
| 2004/0242297 | A1 | 12/2004 | Walker |
| 2004/0242298 | A1 | 12/2004 | Inamura et al. |
| 2004/0242328 | A1 | 12/2004 | Blackburn et al. |
| 2004/0242329 | A1 | 12/2004 | Blackburn et al. |
| 2004/0242330 | A1 | 12/2004 | Blackburn et al. |
| 2004/0242331 | A1 | 12/2004 | Blackburn et al. |
| 2004/0243848 | A1 | 12/2004 | Blackburn et al. |
| 2004/0243849 | A1 | 12/2004 | Blackburn et al. |
| 2004/0248642 | A1 | 12/2004 | Rothschild |
| 2004/0248645 | A1 | 12/2004 | Blackburn et al. |
| 2004/0248646 | A1 | 12/2004 | Canterbury |
| 2004/0248651 | A1 | 12/2004 | Gagner |
| 2004/0254006 | A1 | 12/2004 | Lam et al. |
| 2004/0254013 | A1 | 12/2004 | Quraishi et al. |
| 2004/0254014 | A1 | 12/2004 | Quraishi et al. |
| 2004/0254954 | A1 | 12/2004 | Gatto et al. |
| 2004/0255139 | A1 | 12/2004 | Giobbi |
| 2004/0259629 | A1 | 12/2004 | Michaelson et al. |
| 2004/0259633 | A1 | 12/2004 | Gentles et al. |
| 2004/0259640 | A1 | 12/2004 | Gentles et al. |
| 2004/0259643 | A1 | 12/2004 | Gentles |
| 2004/0266532 | A1 | 12/2004 | Blackburn et al. |
| 2004/0266533 | A1 | 12/2004 | Gentles et al. |
| 2005/0003886 | A1 | 1/2005 | Englman et al. |
| 2005/0003887 | A1 | 1/2005 | Seelig |
| 2005/0009599 | A1 | 1/2005 | Ryan |
| 2005/0009601 | A1 | 1/2005 | Manfredi et al. |
| 2005/0009607 | A1 | 1/2005 | Russell et al. |
| 2005/0010738 | A1 | 1/2005 | Stockdale et al. |
| 2005/0014554 | A1 | 1/2005 | Walker et al. |
| 2005/0014557 | A1 | 1/2005 | Duhamel |
| 2005/0014559 | A1 | 1/2005 | Mattice et al. |
| 2005/0020342 | A1 | 1/2005 | Palmer et al. |
| 2005/0020354 | A1 | 1/2005 | Nguyen et al. |
| 2005/0026679 | A1 | 2/2005 | Lucchesi et al. |
| 2005/0032573 | A1 | 2/2005 | Acres et al. |
| 2005/0032577 | A1 | 2/2005 | Blackburn et al. |
| 2005/0037708 | A1 | 2/2005 | Torvinen |
| 2005/0037838 | A1 | 2/2005 | Dunuevsky et al. |
| 2005/0043072 | A1 | 2/2005 | Nelson |
| 2005/0043088 | A1 | 2/2005 | Nguyen et al. |
| 2005/0043090 | A1 | 2/2005 | Pryzby et al. |
| 2005/0043094 | A1 | 2/2005 | Nguyen et al. |
| 2005/0044535 | A1 | 2/2005 | Coppert |
| 2005/0049037 | A1 | 3/2005 | Anderson et al. |
| 2005/0054431 | A1 | 3/2005 | Walker et al. |
| 2005/0054435 | A1 | 3/2005 | Rodgers et al. |
| 2005/0054438 | A1 | 3/2005 | Rothschild et al. |
| 2005/0054439 | A1 | 3/2005 | Rowe et al. |
| 2005/0054445 | A1 | 3/2005 | Gatto et al. |
| 2005/0054447 | A1 | 3/2005 | Hiroyama et al. |
| 2005/0054448 | A1 | 3/2005 | Frerking et al. |
| 2005/0059457 | A1 | 3/2005 | Rothschild et al. |
| 2005/0059480 | A1 | 3/2005 | Soukup et al. |
| 2005/0059493 | A1 | 3/2005 | Tyson et al. |
| 2005/0059494 | A1 | 3/2005 | Kammler |
| 2005/0064939 | A1 | 3/2005 | McSheffrey et al. |
| 2005/0075889 | A1 | 4/2005 | Gomes et al. |
| 2005/0075983 | A1 | 4/2005 | St. Denis |
| 2005/0081623 | A1 | 4/2005 | Frank |
| 2005/0086286 | A1 | 4/2005 | Gatto et al. |
| 2005/0090313 | A1 | 4/2005 | Rowe |
| 2005/0096114 | A1 | 5/2005 | Cannon et al. |
| 2005/0096126 | A1 | 5/2005 | Prasad et al. |
| 2005/0096133 | A1 | 5/2005 | Hoefelmeyer et al. |
| 2005/0097342 | A1 | 5/2005 | Gatto et al. |
| 2005/0101370 | A1 | 5/2005 | Lind et al. |
| 2005/0101374 | A1 | 5/2005 | Acres |
| 2005/0113172 | A1 | 5/2005 | Gong |
| 2005/0114272 | A1 | 5/2005 | Herrmann et al. |
| 2005/0119045 | A1 | 6/2005 | Fujimoto |
| 2005/0119046 | A1 | 6/2005 | Fujimoto |
| 2005/0119047 | A1 | 6/2005 | Olive |
| 2005/0120672 | A1 | 6/2005 | Gargiulo |
| 2005/0130731 | A1 | 6/2005 | Englmann et al. |
| 2005/0130737 | A1 | 6/2005 | Englmann et al. |
| 2005/0137012 | A1 | 6/2005 | Michaealson |
| 2005/0143168 | A1 | 6/2005 | Torango |
| 2005/0148385 | A1 | 7/2005 | Michaealson |
| 2005/0153767 | A1 | 7/2005 | Gauselmann |
| 2005/0153768 | A1 | 7/2005 | Paulsen |
| 2005/0153773 | A1 | 7/2005 | Nguyen et al. |
| 2005/0159207 | A1 | 7/2005 | Thomas |
| 2005/0159211 | A1 | 7/2005 | Englman |
| 2005/0176488 | A1 | 8/2005 | Olive |
| 2005/0181860 | A1 | 8/2005 | Nguyen et al. |
| 2005/0209004 | A1 | 9/2005 | Torango |
| 2005/0221881 | A1 | 10/2005 | Lannert |
| 2005/0239542 | A1 | 10/2005 | Olsen |
| 2005/0239546 | A1 | 10/2005 | Hedrick et al. |
| 2005/0261059 | A1 | 11/2005 | Nguyen et al. |
| 2005/0261060 | A1 | 11/2005 | Nguyen et al. |
| 2005/0261061 | A1 | 11/2005 | Nguyen et al. |
| 2005/0266517 | A1 | 12/2005 | Ikeda et al. |
| 2005/0266919 | A1 | 12/2005 | Rowe et al. |
| 2005/0282629 | A1 | 12/2005 | Gagner |
| 2005/0282638 | A1 | 12/2005 | Rowe |
| 2006/0003829 | A1 | 1/2006 | Thomas |
| 2006/0003843 | A1 | 1/2006 | Kobayashi et al. |
| 2006/0009273 | A2 | 1/2006 | Moshal |
| 2006/0019747 | A1 | 1/2006 | Loose et al. |
| 2006/0019750 | A1 | 1/2006 | Beatty |
| 2006/0030409 | A1 | 2/2006 | Lechner et al. |
| 2006/0031829 | A1 | 2/2006 | Harris et al. |
| 2006/0035705 | A1 | 2/2006 | Jordon |
| 2006/0036573 | A1 | 2/2006 | Watanabe et al. |
| 2006/0039132 | A1 | 2/2006 | Chen |
| 2006/0040723 | A1 | 2/2006 | Baerlocher et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0046830 | A1 | 3/2006 | Webb |
| 2006/0046839 | A1 | 3/2006 | Nguyen |
| 2006/0063581 | A1 | 3/2006 | Harris et al. |
| 2006/0068892 | A1 | 3/2006 | Gomez et al. |
| 2006/0068893 | A1 | 3/2006 | Jaffe et al. |
| 2006/0079316 | A1 | 4/2006 | Flemming et al. |
| 2006/0079317 | A1 | 4/2006 | Flemming et al. |
| 2006/0084495 | A1 | 4/2006 | Jaffe et al. |
| 2006/0084496 | A1 | 4/2006 | Jaffe et al. |
| 2006/0084502 | A1 | 4/2006 | Downs et al. |
| 2006/0089194 | A1 | 4/2006 | Joshi et al. |
| 2006/0094508 | A1 | 5/2006 | D'Amico et al. |
| 2006/0116201 | A1 | 6/2006 | Gauselmann |
| 2006/0116206 | A1 | 6/2006 | Nelson et al. |
| 2006/0143085 | A1 | 6/2006 | Adams et al. |
| 2006/0148561 | A1 | 7/2006 | Moser |
| 2006/0160611 | A1 | 7/2006 | Okada |
| 2006/0194633 | A1 | 8/2006 | Paulsen |
| 2006/0211486 | A1 | 9/2006 | Walker et al. |
| 2006/0211487 | A1 | 9/2006 | Walker et al. |
| 2006/0211488 | A1 | 9/2006 | Walker et al. |
| 2006/0217183 | A1 | 9/2006 | Mierau et al. |
| 2006/0287036 | A1 | 12/2006 | Daly et al. |
| 2006/0287107 | A1 | 12/2006 | Okada |
| 2007/0004519 | A1 | 1/2007 | Swart et al. |
| 2007/0021182 | A1 | 1/2007 | Gauselmann |
| 2007/0077988 | A1 | 4/2007 | Friedman |
| 2007/0077993 | A1 | 4/2007 | Midgley et al. |
| 2007/0105613 | A1 | 5/2007 | Adams et al. |
| 2007/0111787 | A1 | 5/2007 | Adams et al. |
| 2007/0117616 | A1 | 5/2007 | Bartholomew |
| 2007/0149287 | A1 | 6/2007 | Kubota et al. |
| 2007/0155482 | A1 | 7/2007 | Walker et al. |
| 2007/0155483 | A1 | 7/2007 | Walker et al. |

(56) References Cited

U.S. PATENT DOCUMENTS

| | | | |
|---|---|---|---|
| 2007/0155484 A1 | 7/2007 | Walker et al. |
| 2007/0167218 A1 | 7/2007 | Rothschild et al. |
| 2007/0254734 A1 | 11/2007 | Gilmore et al. |
| 2007/0259706 A1 | 11/2007 | Anderson et al. |
| 2007/0259713 A1 | 11/2007 | Fiden et al. |
| 2007/0265060 A1 | 11/2007 | Hornik et al. |
| 2007/0298856 A1 | 12/2007 | Gilmore et al. |
| 2008/0076503 A1 | 3/2008 | Mattice et al. |
| 2008/0102934 A1 | 5/2008 | Tan |
| 2008/0113770 A1 | 5/2008 | Gelber et al. |
| 2008/0300051 A1 | 12/2008 | Walker et al. |
| 2009/0029760 A1 | 1/2009 | Okada |

FOREIGN PATENT DOCUMENTS

| | | |
|---|---|---|
| EP | 0 843 272 | 5/1998 |
| EP | 0 945 837 | 3/1999 |
| EP | 0 984 409 | 3/2000 |
| EP | 1 004 970 | 5/2000 |
| EP | 1 175 928 | 1/2002 |
| EP | 1 298 609 | 4/2003 |
| EP | 1 199 690 | 2/2004 |
| EP | 1 378 873 | 3/2005 |
| EP | 1 513 114 | 3/2005 |
| EP | 1 238 688 | 5/2005 |
| EP | 1 378 874 | 5/2005 |
| EP | 1 471 710 | 5/2005 |
| EP | 1 291 048 | 6/2005 |
| GB | 2 117 952 | 10/1983 |
| GB | 2 137 392 | 10/1984 |
| GB | 2 144 644 | 3/1985 |
| GB | 2 170 636 | 8/1986 |
| GB | 2 191 030 | 12/1987 |
| GB | 2 222 712 | 3/1990 |
| GB | 2 333 880 | 8/1999 |
| GB | 3 353 128 | 2/2001 |
| JP | 2007-090038 | 4/2007 |
| JP | 2007-117526 | 5/2007 |
| WO | WO 98 35309 | 8/1998 |
| WO | WO 98/52665 | 11/1998 |
| WO | WO 99/29381 | 6/1999 |
| WO | WO 99 41718 | 8/1999 |
| WO | WO 99/60498 | 11/1999 |
| WO | WO 99 65579 | 12/1999 |
| WO | WO 00 12186 | 3/2000 |
| WO | WO 00 25281 | 5/2000 |
| WO | WO 00 32286 | 6/2000 |
| WO | WO 01 61437 | 8/2001 |
| WO | WO 01/83062 | 11/2001 |
| WO | WO 01/83063 | 11/2001 |
| WO | WO 03/013678 | 2/2003 |
| WO | WO 03/025867 | 3/2003 |
| WO | WO 03/026756 | 4/2003 |
| WO | WO 03 045515 | 6/2003 |
| WO | WO 03 045516 | 6/2003 |
| WO | WO 03 049054 | 6/2003 |
| WO | WO 2004 078297 | 9/2004 |
| WO | WO 2004 004855 | 11/2004 |
| WO | WO 2004 103495 | 12/2004 |
| WO | WO 2005 015826 | 2/2005 |
| WO | WO 2005/027063 | 3/2005 |
| WO | WO 2005 028056 | 3/2005 |
| WO | WO 2005 029220 | 3/2005 |
| WO | WO 2005/029287 | 3/2005 |
| WO | WO 2005 033825 | 4/2005 |
| WO | WO 2005 033826 | 4/2005 |
| WO | WO 2005/082480 | 9/2005 |
| WO | WO 2005/097280 | 10/2005 |
| WO | WO 2005 120672 | 12/2005 |
| WO | WO 2006/002241 | 1/2006 |
| WO | WO 2006/004831 | 1/2006 |
| WO | WO 2006/004832 | 1/2006 |
| WO | WO 2006/005073 | 1/2006 |
| WO | WO 2006/017036 | 2/2006 |
| WO | WO 2006/017067 | 2/2006 |
| WO | WO 2006/017068 | 2/2006 |
| WO | WO 2006/020413 | 2/2006 |
| WO | WO 2006/020811 | 2/2006 |
| WO | WO 2006/026250 | 3/2006 |
| WO | WO 2006 027677 | 3/2006 |
| WO | WO 2006 039067 | 4/2006 |
| WO | WO 2006 044252 | 4/2006 |
| WO | WO 2007 035388 | 3/2007 |
| WO | WO 2007/103054 | 9/2007 |
| WO | WO 2008/048634 | 4/2008 |

OTHER PUBLICATIONS

Bally Live-Server Based Gaming brochure, written by Bally Gaming Systems, published in 2006.

Bonusing Solutions without Limits brochure, written by Bally Gaming Systems, published in 2005.

Gold Exchange Advertisement, written by Bally, available prior to Nov. 2006.

SB Products—The Next Big Innovation, printed from www.igt.com in Aug. 2006.

Server Based: Other Possibilities Article; published by www.casinocenter.com in May 2006.

Transferring Gaming brochure, written by Cyberview Technology, published in 2006.

Letter from Marvin Motsenbocker of Mots Law dated Oct. 31, 2011 regarding Third Party Submission in Published Application Under 37 C.F.R. 1.99 filed for U.S. Appl. No. 13/102,582 (1 page).

Third Party Submission in Published Application Under 37 C.F.R. 1.99 filed for U.S. Appl. No. 13/102,582, dated Oct. 31, 2011 (3 pages).

English translation of paragraphs [0012] and [0065] of JP 2007-117526 submitted with Third Party Submission in Published Application Under 37 C.F.R. 1.99 for U.S. Appl. No. 13/102,582 (1 page).

English translation of paragraph [0020] of JP 2007-090038 submitted with Third Party Submission in Published Application Under 37 C.F.R. 1.99 for U.S. Appl. No. 13/102,582 (1 page).

Partially highlighted U.S. Patent Application Publication No. 2007/0149287 submitted with Third Party Submission in Published Application Under 37 C.F.R. 1.99 for U.S. Appl. No. 13/102,582 (4 pages).

Partially highlighted U.S. Patent Application Publication No. 2006/0003843 submitted with Third Party Submission in Published Application Under 37 C.F.R. 1.99 for U.S. Appl. No. 13/102,582 (2 pages).

Partially highlighted U.S. Patent Application Publication No. 2006/0116206 submitted with Third Party Submission in Published Application Under 37 C.F.R. 1.99 for U.S. Appl. No. 13/102,582 (3 pages).

Partially highlighted U.S. Pat. No. 6,319,119 submitted with Third Party Submission in Published Application Under 37 C.F.R. 1.99 for U.S. Appl. No. 13/102,582 (2 pages).

FIG. 6A 16,18

Figures 6A, 6B:
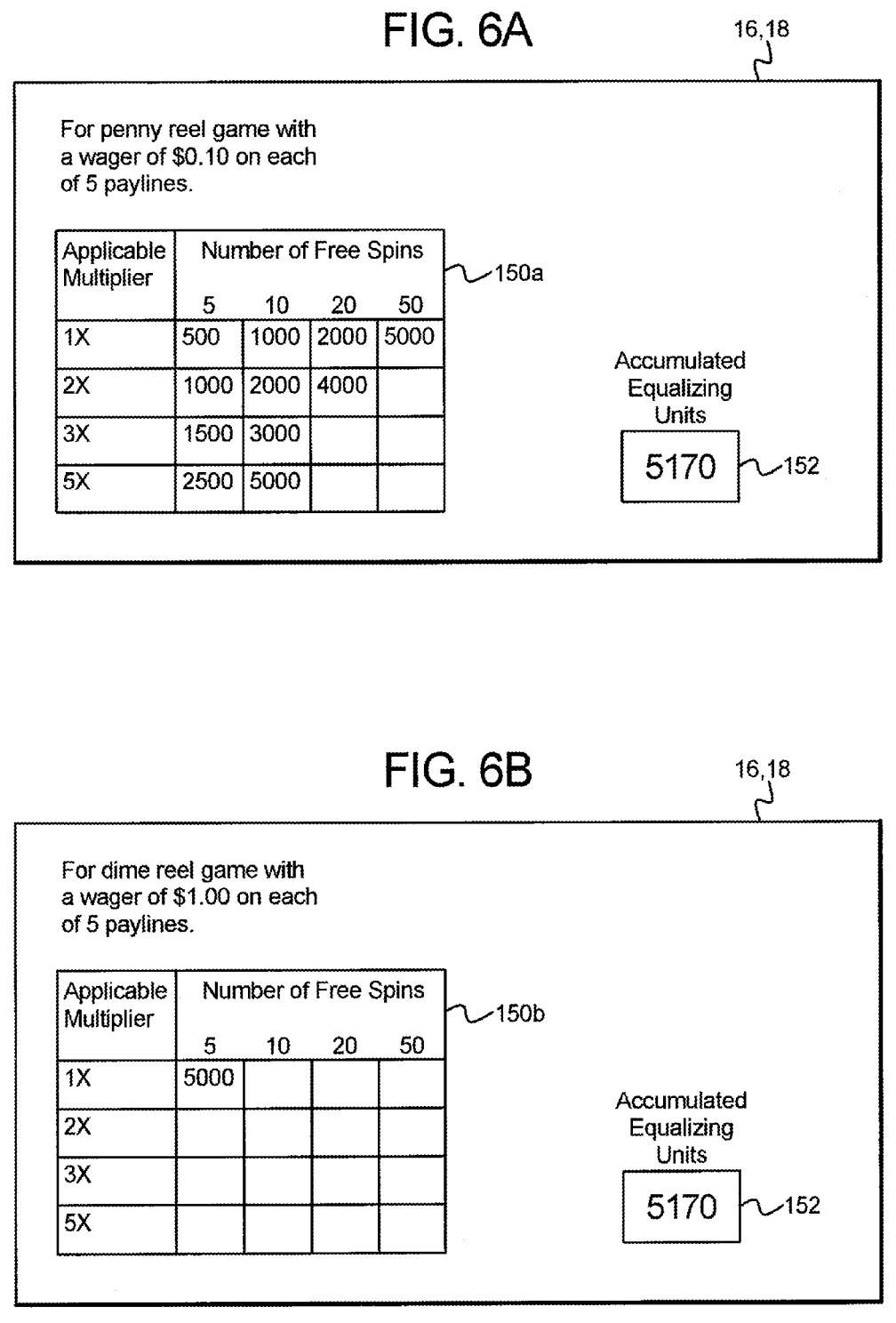

For penny reel game with a wager of $0.10 on each of 5 paylines.

150a

| Applicable Multiplier | Number of Free Spins 5 | 10 | 20 | 50 |
|---|---|---|---|---|
| 1X | 500 | 1000 | 2000 | 5000 |
| 2X | 1000 | 2000 | 4000 | |
| 3X | 1500 | 3000 | | |
| 5X | 2500 | 5000 | | |

Accumulated Equalizing Units

5170

152

FIG. 6B 16,18

For dime reel game with a wager of $1.00 on each of 5 paylines.

150b

| Applicable Multiplier | Number of Free Spins 5 | 10 | 20 | 50 |
|---|---|---|---|---|
| 1X | 5000 | | | |
| 2X | | | | |
| 3X | | | | |
| 5X | | | | |

Accumulated Equalizing Units

5170

152

| Free Spin | Modified Free Spin Award Amount |
|---|---|
| 1 | $3.00 |
| 2 | $0.00 |
| 3 | $12.00 |
| 4 | $0.00 |
| 5 | $1.50 |

Total Award: $16.50

GAMING SYSTEM AND METHOD FOR PROVIDING AN ADDITIONAL GAMING CURRENCY

PRIORITY CLAIM

This application is a continuation application of, claims priority to and the benefit of U.S. patent application Ser. No. 13/540,975, filed on Jul. 3, 2012, which is a continuation application of, claims priority to and the benefit of U.S. patent application Ser. No. 13/102,582, filed on May 6, 2011, which is a continuation application of, claims priority to and the benefit of U.S. patent application Ser. No. 11/830,626, filed on Jul. 30, 2007, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which enable players to play primary or base games in exchange for monetary credits or dollars wagered are well known. In these gaming machines, the amount of monetary credits or dollars placed as the wager on the primary game may vary based on the denomination of the gaming machine and the maximum number of credits associated with the gaming machine. For instance, the gaming machine may enable the player to wager a minimum number of credits, such as one credit (e.g., one penny, nickel, dime, quarter or dollar) up to the maximum number of credits, such as five credits. Thus, it is known that a gaming machine may enable players to make wagers of substantially different monetary credit or dollar amounts on each play of the primary or base game. Accordingly, it should be appreciated that monetary credits or dollars are a known form of currency in gaming establishments which enable different players to wager different amounts at substantially different rates of play.

Player tracking points are another known form of currency in gaming establishments. Player tracking points are typically maintained by a player tracking system. Player tracking systems enable gaming establishments to recognize the value of customer loyalty through identifying frequent and/or high wagering players and rewarding them for their patronage. The cumulative history of a particular player's gaming activity, which is included in a player profile of a typical player tracking system, enables gaming establishments to target individual players with direct marketing promotions or customized reward plans. In typical known player tracking systems, the gaming establishment issues each participating player a player identification card which has an encoded player identification or player tracking account number that uniquely identifies that player. When the player sits down at a gaming device, the player inserts the player tracking card into a card reader which sends information or data to a player tracking system to identify the player and the player's player tracking account. The gaming machine typically monitors any player tracking points the player earns for their current gaming session and upon the player removing their player tracking card, the gaming machine communicates information or data relating to the player's gaming session to the player tracking system. Upon the conclusion of the player's current gaming session, the player tracking system updates the player's player tracking account accordingly. Thus, known player tracking systems do not provide player tracking points for a player's current gaming session which are immediately redeemable.

In one known player tracking system, upon the player removing their player tracking card, the gaming machine sends the player tracking system information or data on the credit amounts the identified player wagered. This player tracking system provides player tracking points to the player's player tracking account based on such wagered amounts or coin-in. In another known player tracking system, upon the player removing their player tracking card, the gaming machine sends the player tracking system information or data on the credit amounts the identified player won. This player tracking system provides player tracking points to the player's player tracking account based on such amounts won or coin-out. It should be appreciated that in player tracking systems wherein player tracking points are provided based on coin-out, it is advantageous for a player to play a gaming machine with a greater average expected payout percentage. For example, if a player tracking system provides 1 player tracking point for each $10 wagered, then a first player who deposits $100 into a first gaming device with an average expected payback percentage of 85% and plays until the credit meter is $0.00 will theoretically wager a total of $560. This $560 wagered includes 56 occurrences of $10 wagered and thus the player tracking system provides the first player with 56 player tracking points. In this example, a second player who deposits $100 into a second gaming device with an average expected payback percentage of 95% and plays until the credit meter is $0.00 will theoretically wager a total of $1890. This $1890 wagered includes 189 occurrences of $10 wagered and thus the player tracking system provides the second player with 189 player tracking points. Accordingly, these player tracking systems are configured such that a player playing a gaming machine with a higher average expected payback percentage (and thus a higher expected return) is also provided the additional benefit of a greater number of player tracking points.

Known gaming establishment or casino loyalty programs work in conjunction with a player tracking system to offer incentives to players in exchange for the player's loyalty to and play history at the gaming establishment. That is, based on the information or data regarding the player's gaming activity, the gaming establishment classifies each player and provides one or more of such players certain benefits based on these classifications. Certain of these benefits include providing the player a complimentary hotel room or flight back to the gaming establishment for a later date. Certain others of these benefits include enabling the player to participate in a promotion at a later date or upon a future visit to the gaming establishment. However, few players actually benefit from the running of such non-monetary promotions. It should be appreciated that such benefits which include a benefit provided at a later date are not readily redeemable by the player in exchange for their player tracking points.

Promotional credits are another known form of currency at a gaming establishment. Promotional credits (delivered as either direct mail offers or as a result of a loyalty bonus) utilized in one or more wagering games provide loyalty incentives to players. Such promotional credits are often offered as a one time event such as for a player signing up for a player tracking card. It should be appreciated that providing promotional credits to a player is often preferable over providing non-promotional or monetary credits to a player because known promotional credits are not immediately redeemable by a player for cash and must be played through the gaming machine.

Many gaming establishments or casinos have thousands of different gaming machines which provide players awards in thousands of different primary or base games. These different gaming machines typically accept different wager amounts and/or different denominations. In the primary or base game of these gaming machines, the awards are typically based on the player obtaining a winning symbol or symbol combination and on the amount of the wager (e.g., the higher the wager, the higher the award). Symbols or symbol combinations which are less likely to occur usually provide higher awards. It should be appreciated that many of the different primary games of these different gaming machines include different paytables that have different average expected payback percentages which are selected by the gaming establishment operator. It should be further appreciated that it is rare that two gaming devices have identical paytables with identical average expected payback percentages.

Many known different gaming machines also each include one or more known secondary or bonus games. Such secondary or bonus games usually do not require an additional wager by the player to be activated and usually provide an additional award to the player. Most secondary or bonus games occur upon an occurrence of a triggering event and are played after the occurrence of the triggering event. Many of these different secondary or bonus games include different features and are associated with different average expected payouts. These different secondary or bonus games include different levels of volatility. Accordingly, as a gaming establishment includes thousands of different gaming machines which include thousands of different primary games and thousands of different secondary games, player's have a great number of gaming options available to them at any given time.

Server based gaming is also known. In a server based gaming environment, a central server is configured to alter the content and/or settings of a particular gaming machine in communication with the central server. In this manner, the gaming machine in communication with the central server is configured to receive certain commands and/or prompts from the central server which will cause the game to act in a specific manner. For example, in response to commands from a central server, a gaming machine may provide a gaming system award to one or more players, change games, reconfigure available denominations and/or reconfigure different paytables or average expected payback percentages. In another example, the central server is operable to download one or more games or other gaming parameters to a gaming machine to provide a gaming system award to one or more players, change games, reconfigure available denominations and/or reconfigure different paytables or average expected payback percentages.

Certain known central server use a rules engine to interact with the gaming machine. One example of the central server interacting with a gaming machine is the central server monitoring that a player has hit twenty-five four-of-a-kinds in a poker game and the rules engine causing the gaming machine to inform the player that if they hit five more four-of-a-kinds in the next three days, the player will win a bonus award of $1000. However, such known server based gaming system lack in providing a promotion that can be linked to each of the thousand of different gaming machines at a gaming establishment. It should be appreciated that as more server based gaming systems are implemented in gaming establishments, new methods of enhancing different players' gaming experiences and new methods of enhancing the gaming establishment's utilization of such server based gaming systems need to be developed.

There is a continuing need to provide new and different gaming machines and gaming systems as well as new and different ways to provide awards to players as part of their gaming experience.

SUMMARY

In one embodiment, the gaming system and method disclosed herein provides a new gaming currency which is in addition to and different than current known gaming establishment currencies, such as monetary credits, promotional credits and player tracking points. This gaming currency is accumulated in real-time based on the player's current gaming session and further redeemable in real-time during the player's current gaming session. Accordingly, unlike certain known gaming currencies which are configured to provide a player a benefit only at a later date or subsequent gaming session, this gaming currency is configured to provide a player an immediate benefit during the player's current gaming session or at a subsequent gaming session. Moreover, unlike certain known gaming systems which provide players at gaming machines with higher relative average expected payback percentages the additional benefit of higher amounts of certain gaming currencies, in one embodiment, the gaming system and method disclosed herein provides a higher amount of the new gaming currency to players at gaming devices having lower relative average expected payout percentages. In this embodiment, in accounting for different gaming devices having different average expected payback percentages, the gaming system adjusts the amounts of the new gaming currency provided to different players at such different gaming devices to compensate for such differences in payback percentages.

In one embodiment, the gaming system and method disclosed herein incorporates a level of randomness in providing this new gaming currency to players. In another embodiment, the gaming system and method disclosed herein further incorporates one or more player selection features in providing this new gaming currency to players. In these gaming systems, such randomness and player selection features provide an increased amount of volatility in the accumulation of this gaming currency and also an increased amount of volatility in the redemption of this gaming currency.

In one embodiment, the gaming system and method disclosed herein includes a point or count based system to provide one or more awards to one or more players in an equitable manner, regardless of what game or game type they are playing. The points or counts used in this gaming system (referred to herein as "equalizing units" or "equalized units") are accumulated by the gaming system for a player (in a player account) based on one or more events associated with the player's gaming experience. The points or counts utilized in the gaming system are selectively redeemable by the player in exchange for one or more awards or opportunities to win an award on any gaming device enrolled in the gaming system disclosed herein. It should be appreciated that in one embodiment, the equalizing units disclosed herein are different, separate and independent from any monetary based points or credits, any promotional based points or credits, or any player tracking points. In other words, in this embodiment, the equalizing units disclosed herein are not directly redeemable for direct currency and are further not associated with a player's point balance in a player's player tracking account.

In one embodiment, to account for the many different types of gaming devices in the gaming system providing different games with different parameters or characteristics, upon the occurrence of an equalizing unit accumulation event, the gaming system utilizes one or more normalization equations to determine quantities of equalizing units to provide to a player based on the player's specific wagering activity and the specific paytable associated with the player's currently played gaming device. In this embodiment, as the player may be playing at and thus utilizing any suitable paytable of any suitable gaming device in the gaming system, in determining an appropriate number of equalizing units to provide to the player, the gaming system must account for, for example, the paytable of the specific game played by the player, including the average expected payout of each game played. In other words, in one embodiment, the gaming system disclosed herein equates or normalizes the earning or distribution of equalizing units to provide equality to players playing different games at different gaming devices which are associated with different paytables.

In one embodiment, the gaming system enables a player to redeem any accumulated equalizing units in the player's account to participate in one or more game events, such as one or more plays of a bonus game. In this embodiment, if the player selects to cause an equalizing unit redemption event to occur, the gaming system enables the player to selectively utilize their accumulated equalizing units to determine what games to participate in and when to participate in such games. In one such embodiment, to account for enabling the player to selectively participate in one or more of the different suitable games associated with different suitable gaming devices of the gaming system, the gaming system determines the parameters of the available games based on the quantity of accumulated equalizing units, the player's specific wagering activity and the specific paytable associated with the selected game. That is, since the player may select to play any suitable available game associated with the gaming system (and thus utilize the paytable of any suitable available game in the gaming system), in determining the quantity of equalizing units which must be redeemed for each available game, the gaming system must account for the paytable of the specific game selected by the player, including the average expected payout of each game played. In other words, the gaming system disclosed herein enables a player to play any suitable available game incorporating any suitable available features when they want and the amount of equalizing units which must be redeemed for a play of such a game is determined accordingly. Such a configuration provides that the different gaming machines associated with different paytables of the gaming system are integrated via the equalizing units disclosed herein.

In one embodiment, determining a quantity of equalizing units to redeem specific to the parameters of the selected game enables the central server to provide the player a suitable game associated with any suitable gaming device in the gaming system. For example, if a player selects to play a first game associated with a first gaming device in the gaming system, the gaming system determines and utilizes a first quantity of equalizing units which must be redeemed to play that first game (i.e., based on the player's bet and the paytable associated with the first game). In this example, if the player selects to play a second game associated with a second gaming device in the gaming system, the gaming system determines and utilizes a second, different quantity of equalizing units which must be redeemed to play that second game (i.e., based on the player's bet and the paytable associated with the second game). Such a configuration provides that the gaming system is operable to determine a quantity of equalizing units to redeem in association with any game available in the gaming system and thus a player may redeem their accumulated equalizing units in association with any play of any suitable game at any suitable gaming device in the gaming system.

In one embodiment, the gaming system disclosed herein includes a central server, central controller or remote host in communication with or linked to a plurality of gaming machines or gaming devices. In one embodiment, the central server determines whether to provide a player one or more equalizing units based on one or more aspects or game parameters of the player's gaming experience. In this embodiment, if the central server determines to provide a player one or more equalizing units (i.e., an equalizing unit accumulation event has occurred), the central server determines a number or quantity of equalizing units to provide to the player based on one or more aspects or game parameters of the player's gaming experience. In one embodiment, the accumulation of a player's associated equalizing units is displayed to (or otherwise accessible by) a player to provide the player a tangible result in earning progress toward obtaining a bonus award.

In different embodiments, the central server utilizes one or more suitable algorithms or equations to determine whether to provide a player one or more equalizing units and/or an amount or quantity of equalizing units to provide to the player based on:

(i) an amount of coin-in (i.e., an amount of wagers placed by the player),
(ii) an amount of coin-out (i.e., an amount of credits provided to the player),
(iii) a generation of a designated symbol or symbol combination or other game element,
(iv) a number or quantity of games played,
(v) an amount of time of game play,
(vi) a designated threshold reached,
(vii) a bet level,
(viii) a length of time,
(ix) a length of time after a designated amount is wagered,
(x) a number of active gaming machines, or
(xi) any combination thereof.

In different embodiments, the central server further determines whether to provide a player one or more equalizing units and/or an amount or quantity of equalizing units to provide to the player based on one or more of:

(i) a random determination,
(ii) a preset determination,
(iii) a determination by the central controller,
(iv) a determination by one or more gaming devices,
(v) a determination based on the status of one or more players (such as determined through a player tracking system),
(vi) a determination based on one or more side wagers placed,
(vii) a determination based on a player's primary game wager,
(viii) a determination based on the amount of coin-in accumulated in one or more pools,
(ix) a promotion run by a gaming establishment, or
(x) any other suitable determination.

In one such embodiment wherein the central server provides a player with one or more equalizing units based on a percentage of coin-in (i.e., a percentage of the player's coin-in wagers placed on primary games at the gaming machines in the gaming system), to account for different gaming devices utilizing different wager denominations, the central server tracks the player's coin-in in any suitable compatible or comparable manner such as credits wagered (i.e., if all of the gaming machines of the gaming system are of the same denomination) or monetary units (e.g., total dollars or other currency) wagered. It should be appreciated that tracking in monetary units accounts for gaming machines having multi-denominations and/or for gaming machines of different denominations and/or gaming machines which accept different currencies. For example, if a gaming system operator sets a threshold of $3.00 of coin-in wagered for a player to earn an equalizing unit, for a player playing a penny gaming device, the central server provides the player with an equalizing unit after the player has wagered 300 coins (i.e., 300 monetary units) and for a player playing a nickel gaming device, the central server provides the player with an equalizing unit after the player has wagered 60 coins (i.e., 300 monetary units).

In another such embodiment wherein the central server provides a player with one or more equalizing units based on a percentage of coin-in, to account for different gaming devices having different payback percentages, the central server adjusts the amounts of equalizing units provided to compensate for the differences in payback percentages. In this embodiment, the central server provides different quantities of equalizing units for the same or substantially the same amount of coin-in placed at different gaming devices. Such a configuration provides for a gaming system which awards the same or substantially the same quantity of equalizing units for the same theoretical loss over a designated period of time. For example, if a first game at a first gaming device is associated with an average expected payback percentage of 85% and a second game at a second gaming device is associated with an average expected payback percentage of 95%, then to normalize the equalizing units provided based on game payback percentages, for the same amount of coin-in, the player playing the first game at the first gaming device earns more equalizing units than the player playing the second game at the second gaming device. In this example, the first game at the first gaming device associated with the average expected payback percentage of 85% provides a player 10 equalizing units for every $10 wagered and the second gaming device associated with the average expected payback percentage of 95% provides a player 3 equalizing units for every $10 wagered.

In one such embodiment wherein the central server provides a player with one or more equalizing units based on a percentage of coin-out, to account for different gaming devices having different payback percentages, the central server adjusts the amounts of equalizing units provided to compensate for the differences in payback percentages. In this embodiment, the central server provides different quantities of equalizing units for the same or substantially the same amount of coin-out provided at the different gaming devices. In another such embodiment, the gaming system includes a coin-out threshold wherein equalizing units are provided based on an amount of coin-out greater than the coin-out threshold. As the quantities of equalizing units in these embodiments are based on an amount of coin-out, which is based on one or more randomly generated outcomes associated with the plays of the game, such a configuration provides an increased level of volatility to the gaming system disclosed herein. That is, by providing equalizing units based on an amount of coin-out (which is based on one or more randomly generated symbols or symbol combinations), the player has a chance to receive equalizing units in an unpredictable way and is further eligible to receive larger chunks of equalizing units based on game events.

In one such embodiment wherein the central server provides a player with one or more equalizing units based on one or more specific symbols or symbol combinations, the central server flags or designates such specific symbols or symbol combinations. In this embodiment, the generation of such flagged specific symbols or symbol combinations does not necessarily trigger a game, but causes the central server to determine a quantity of equalizing units, if any, to provide to the player. It should be appreciated that querying the central server to determine a quantity of equalizing units to provide (upon the generation of a flagged symbol or symbol combination) provides another way to normalize the distribution of equalizing units. This configuration provides the central server the opportunity to analyze a number of game parameters (such as game type, bet level, payout percentage) of the player's currently played gaming device to determine how many equalizing units to provide to the player (and in turn to determine what percentage payback to return to the player in the form of equalizing units). For example, the gaming system or gaming system operator sets up parameters such that 1% of payback will be returned to the player in the form of equalizing units based on generated symbol combinations. In this example, if the paytable is set such that the specific flagged symbol combination will occur approximately every 1000 games, then the central server determines that if the flagged symbol combination is generated (i.e., an occurrence of an equalizing unit accumulation event), the gaming device provides the player a quantity of equalizing units equivalent to 10 times their bet.

It should be appreciated that this embodiment of utilizing symbol combinations to award equalizing units provides an increased level of volatility to the gaming system disclosed herein. By providing equalizing units based on one or more generated symbols or symbol combinations, the player has a chance to receive equalizing units in an unpredictable way and is further eligible to receive larger chunks of equalizing units based on game events. Such a configuration provides increased enjoyment and excitement to the player. In other words, the volatility associated with generating different symbol combinations provides the player a chance of quickly replenishing their equalizing units as opposed to the length of time required by refreshing through a less volatile manner, such as the described above embodiments relating to equalizing units accumulation events occurring solely based on an amount of coin-in.

In one embodiment, the gaming system disclosed herein tracks the occurrences of one or more suitable events occurring at or in association with one or more gaming devices in the gaming system. In this embodiment, upon the gaming system determining that the quantity of tracked occurrences of the suitable event has reached a designated quantity or threshold, (i.e., an occurrence of an equalizing unit accumulation event), the gaming system causes a quantity of equalizing units to be provided to at least one of the players at at least one of the gaming devices in the gaming system. In this embodiment, by linking each gaming device in the gaming system, the gaming system disclosed herein is operable to identify and track any occurrence of any event at any of the linked gaming devices. Such a configuration provides that any suitable event, regardless of how often that event occurs, may be tracked and tied to the occurrence of an equalizing unit accumulation event.

In one embodiment, the quantity or amount of equalizing units provided to a player is predetermined upon the occurrence of an equalizing unit accumulation event. In another embodiment, the quantity or amount of equalizing units provided to a player is based on a player's status determined through a player tracking system. In another embodiment, the quantity or amount of equalizing units provided to a player is randomly determined upon the occurrence of an equalizing unit accumulation event. In one such embodiment, the quantity or amount of equalizing units provided is determined based on an average expected quantity of equalizing units for the specific equalizing unit accumulation event that occurred. For example, if an equalizing unit accumulation event is associated with an average expected quantity of 50 equalizing units, the gaming device/central server displays three selections to the player wherein the first selection is associated with 25 equalizing units, the second selection is associated with 50 equalizing units and the third selection is associated with 75 equalizing units (i.e., the three selections have an average quantity of 50 equalizing units). In this example, the gaming device enables the player to pick one of the selections to obtain an associated quantity of equalizing units. This example provides an increased level of volatility and a player selection aspect to determining a quantity of equalizing units to provide to the player. It should be appreciated that any suitable equalizing unit accumulation event sequence, such as any game described herein, may be implemented in determining the quantity of equalizing units to provide to the player.

In one embodiment, the gaming system enables a player to redeem accumulated equalizing units for one or more occurrences of a game event, such as one or more plays of a bonus game or bonus sequence. In another embodiment, the gaming system enables a player to redeem accumulated equalizing units for one or more plays of a primary game. In these embodiments, if the player selects to cause an equalizing unit redemption event to occur, the gaming system enables the player to selectively utilize their accumulated equalizing units to determine what available games to participate in and when to participate in such games. In another embodiment, the gaming system enables a player to redeem any accumulated equalizing units for a modification to one or more aspects of a primary game. In this embodiment, if the player selects to cause an equalizing unit redemption event to occur, the gaming system enables the player to selectively utilize their accumulated equalizing units to determine which aspects of one or more primary games to change and when these changed aspects are to be implemented.

In one embodiment, the central server determines the quantity of equalizing units which must be redeemed to participate in each available different game based on the average expected payout for that game. In other words, the equalizing unit cost of each play of each game is based, at least in part, on the expected benefit to the player. For example, a first game with an average expected payout of $10 is associated with 1,500 redeemed equalizing units (i.e., costs the player 1,500 equalizing units to participate) and a second game with an average expected payout of $20 is associated with 3,000 redeemed equalizing units (i.e., costs the player 3,000 equalizing units to participate). Such a configuration provides an additional avenue to normalize the costs of different available games associated with different gaming devices in the gaming system. That is, the gaming system disclosed herein accounts for different games at different gaming devices having different average expected payouts and determines a quantity of equalizing units for each redeemed game played based on such different average expected payouts.

In another example embodiment, the gaming system enables the player the option of choosing which of a plurality of suitable games which incorporate suitable features they wish to spend their accumulated equalizing units on. For example, in exchange for a set quantity of 20,000 equalizing units, the gaming device enables the player to play either 4 free spins at a multiplier of 5× or 20 free spins at a multiplier of 1×. It should be appreciated that in this example embodiment, in determining the number of free spins to provide to the player in redemption of a quantity of equalizing units, the central server must account for the average expected payout or value of each free spin (which is based on the selected game and the paytable utilized for each free spin, wherein the paytable utilized is based on the player's wager amount) and equate this value or amount to a quantity or amount of redeemed equalizing units.

In one embodiment, the gaming system displays to the player the different games available and the quantity of equalizing units which must be redeemed in association with each of these available games. In one such embodiment, via a service window which displays the player's accumulated equalizing units and available games, the gaming system enables the player to modify or change one or more parameters or game features of one or more of the different available games. In one embodiment, the gaming system enables the player to select certain features or attributes of a selected game in exchange for the player redeeming a designated number of the player's accumulated equalizing units. In this embodiment, if the player changes at least one parameter or game feature of at least one available game, the central server dynamically modifies or changes the quantity of equalizing units which must be redeemed in association with the modified or changed game. Such a configuration provides that as a player customizes their gaming experience by modifying one or more aspects of a game (which in turn modifies the average expected payout associated with the game), the gaming system modifies the quantity of equalizing units which must be redeemed in association with one or more plays of the modified game. For example, if the player increases the wager per line the players wants to be applied to a selected game, the average expected payout for that selected game increase and accordingly the central server increases the quantity of equalizing units which must be redeemed in association with that selected game.

In different embodiments, the games a player may redeem their equalizing units for includes, but is not limited to:

(i) one or more activations or plays of a game of choice,
(ii) one or more activations or plays of a generic game,
(iii) one or more activations or plays of the player's current game,
(iv) one or more activations or plays of a primary game,
(v) one or more activations or plays of a bonus game,
(vi) one or more activations or plays of a selection game,
(vii) one or more activations or plays of an offer and acceptance type game,
(viii) one or more activations or plays of an advancement game,
(ix) one or more activations or plays of a competition type game,
(x) one or more activations or plays of an elimination style game,
(xi) one or more activations or plays of a path game.
(xii) one or more activations or plays of a skill game, (xiii) one or more activations or plays or plays of a perceived skill game,
(xiv) one or more activations or plays of an instant win bonus game,
(xv) one or more activations or plays of a convert to cash bonus game,
(xvi) one or more activations or plays of a slot game.
(xvii) one or more activations or plays of a poker game,
(xviii) one or more activations or plays of a blackjack game,
(xix) one or more activations or plays of a wheel game,
(xx) one or more activations or plays of a game incorporating a physical device,
(xxi) one or more activations or plays of a game incorporating a non-physical device,
(xxii) one or more activations or plays of a group game or event,
(xxiii) one or more activations or plays of a promotional game or event,
(xxiv) one or more activations or plays of a bingo game,
(xxv) one or more activations or plays of an auction event,
(xxvi) one or more activations or plays of a video game,
(xxvii) one or more activations or plays of a game at a gaming table.
(xxviii) one or more activations or plays of a tournament game,
(xxix) one or more drawing tickets,
(xxx) one or more modifiers of one or more game,
(xxxi) any game disclosed herein,
(xxxii) one or more activations or plays of any game disclosed herein,
(xxxiii) any combination thereof, or
(xxxiv) any other type of game defined or desired by the gaming system operator.

In another embodiment, the gaming system enables a player to redeem any accumulated equalizing units for one or more non-game prizes, such as merchandise, meals, expiring inventory, or any other offer deemed appropriate by the gaming system operator.

In another embodiment, the gaming system enables a plurality of players to accumulate and redeem equalizing units as a group. In one such embodiment, the gaming system enables a plurality of players to accumulate equalizing units individually and redeem their accumulated equalizing units as a group. In another such embodiment, the gaming system enables a plurality of players to accumulate equalizing units as a group and redeem their accumulated equalizing units individually.

The utilization of equalizing units as described herein provides an opportunity to provide bonus events to players in a server based gaming environment. That is, the number of ways the accumulation and/or redemption of equalizing units can be normalized among different games and/or denominations played provides that bonus events remain fair to all players and can be effectively accounted for by the gaming system operator. Such a configuration provides that players experience a tangible benefit from the equalizing units which further enhances the player's enjoyment and excitement.

Accordingly, the gaming system and method disclosed herein provides a gaming establishment operator maximum flexibility in offering bonus events to players in exchange for accumulated equalizing units. Such a gaming system further provides the gaming establishment operator an alternative means to provide incentives to players in the form of equalizing units.

Additional features and advantages are described in, and will be apparent from, the following Detailed Description and the figures.

BRIEF DESCRIPTION OF THE FIGURES

FIGS. 6A and 6B are enlarged elevation views of one embodiment of a gaming device of the gaming system disclosed herein illustrating the different bonus games available to be played and the different quantities of equalizing units associated with each available bonus game.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
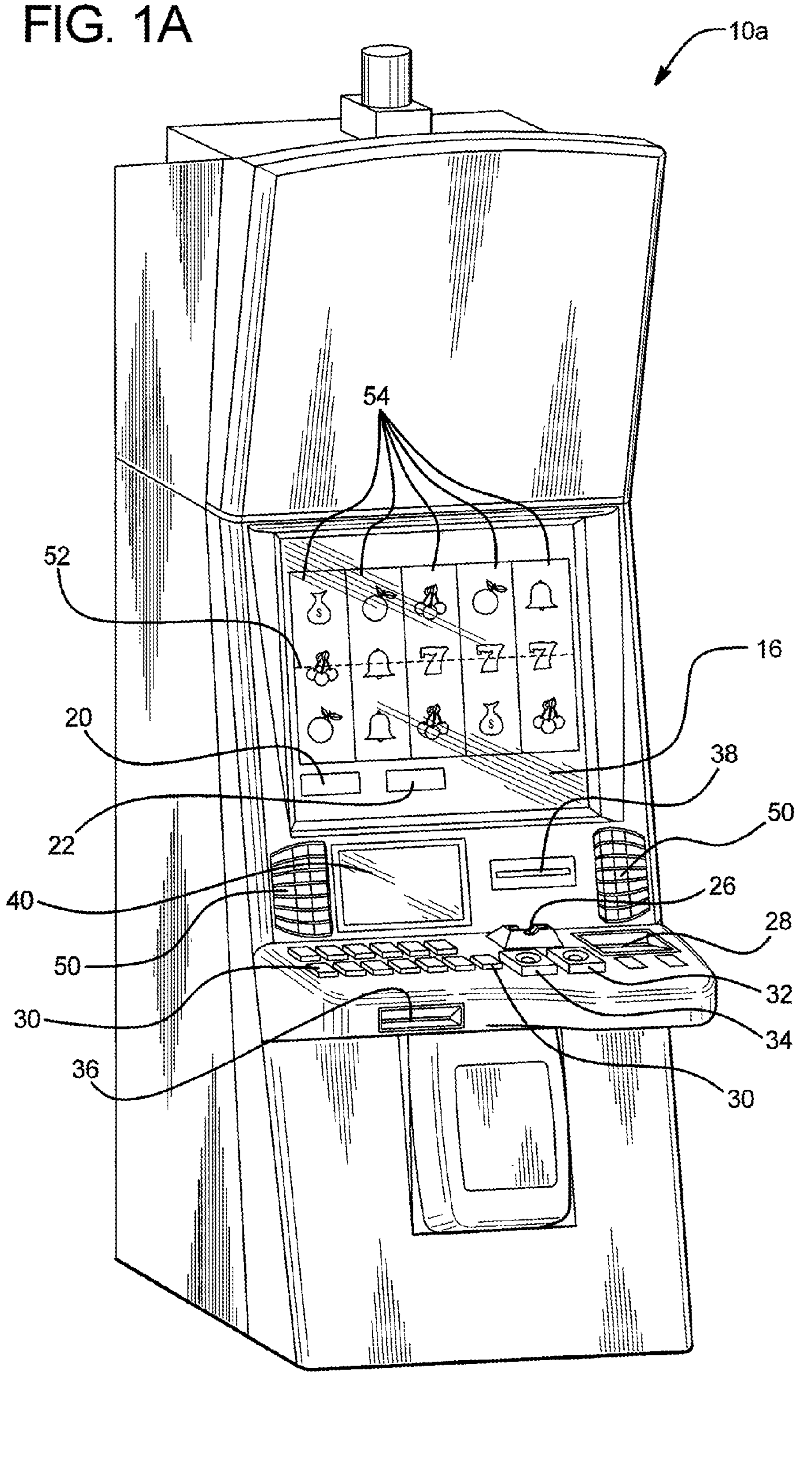
FIGS. 1A and 1B are front perspective views of alternative embodiments of gaming devices disclosed herein.
Figure 1B:
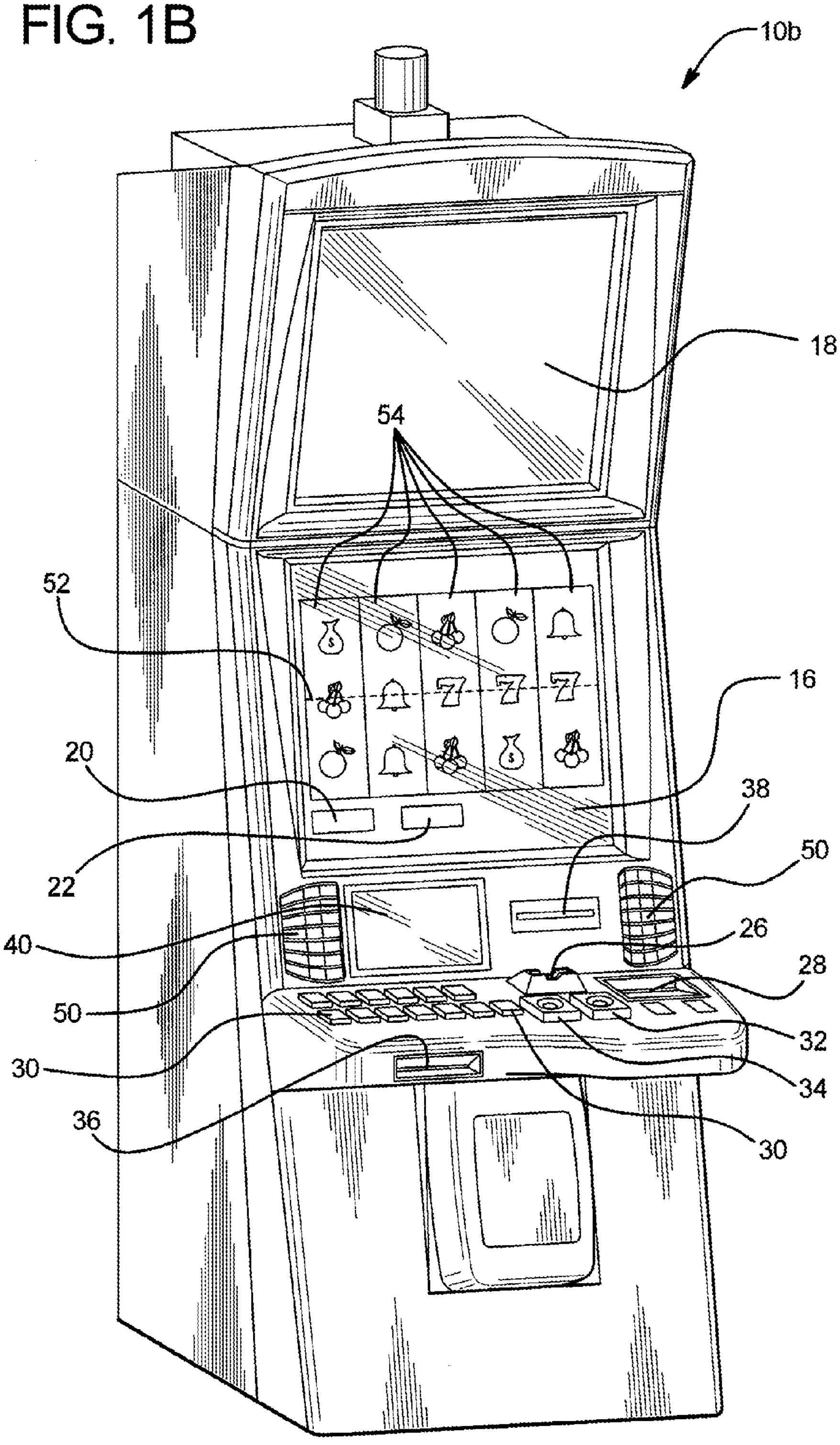

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
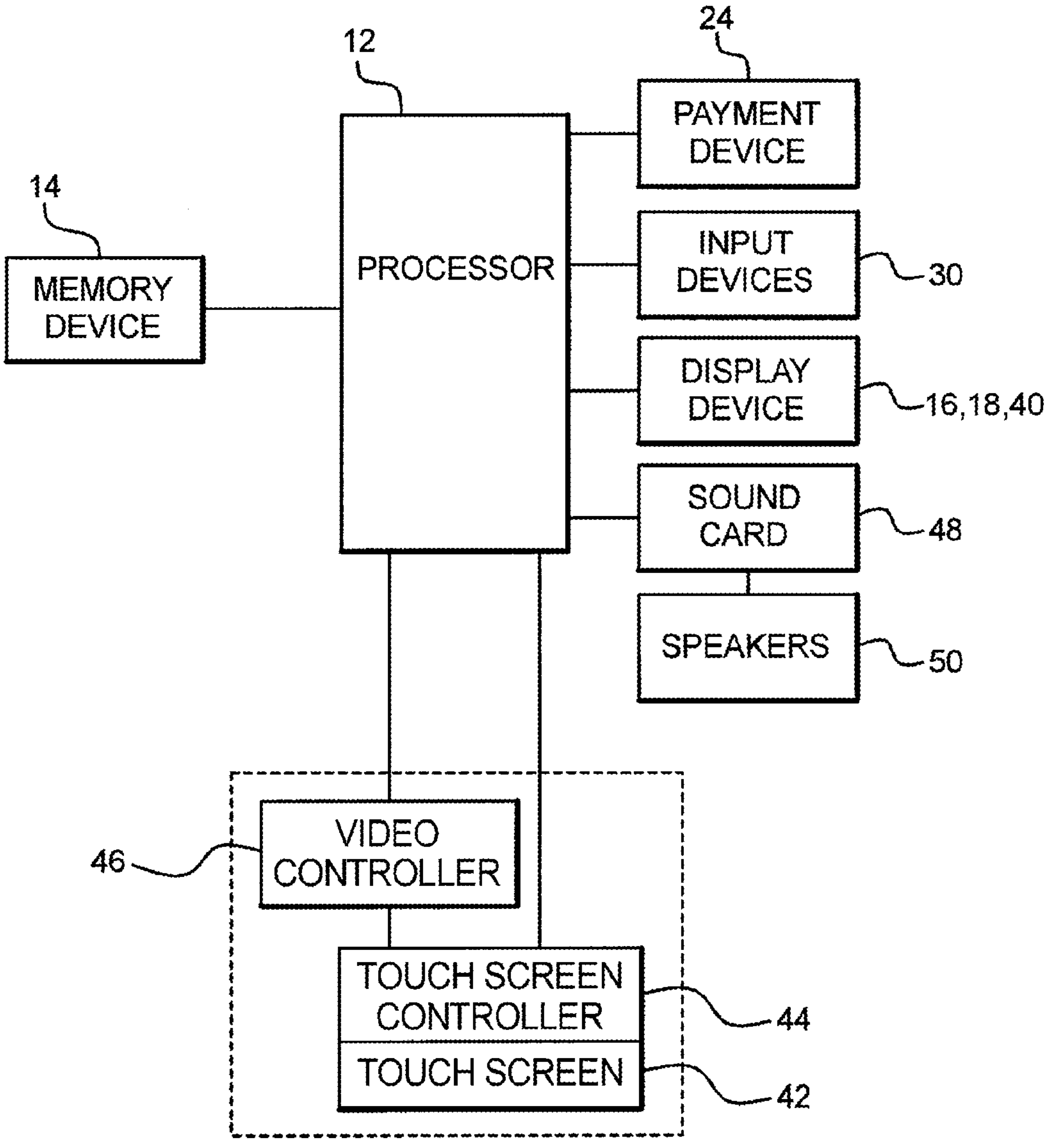
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. The display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 18 and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (I.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. The gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. In this embodiment, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
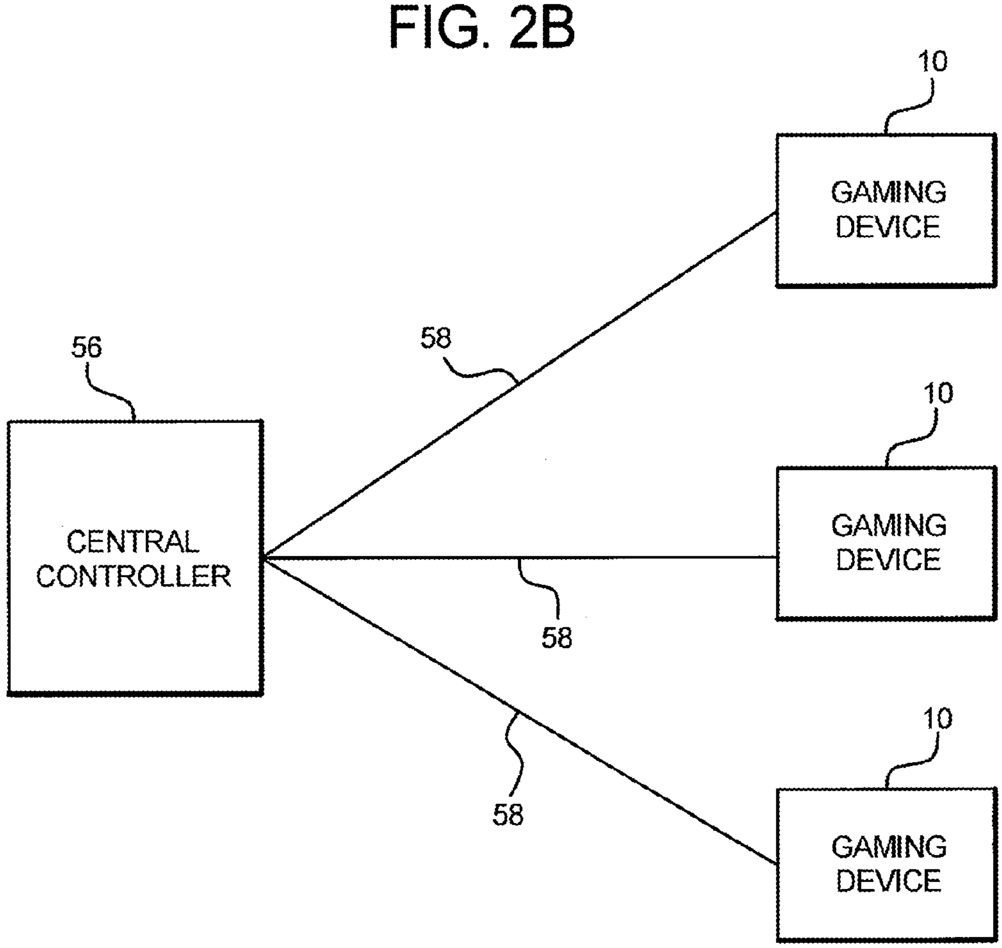
FIG. 2B is a schematic diagram of the central server in communication with a plurality of gaming machines in accordance with one embodiment of the gaming system disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device (s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Equalizing Units

In one embodiment, the gaming system provides a point or count based system wherein players redeem designated quantities of accumulated points or counts (sometimes referred to herein as "equalizing units" or "equalized units") in exchange for one or more opportunities to win one or more awards. In one such embodiment, the gaming system maintains a plurality of equalizing units wherein each equalizing unit has an inherent value which is different than the value associated with a monetary credit, a promotional credit and any value associated with any player tracking point. It should be appreciated that in one embodiment, the equalizing units disclosed herein are separate and independent from any monetary credits, monetary based points, promotional credits, promotional based points or any player tracking points. In other words, in this embodiment, the equalizing units disclosed herein are not redeemable for direct currency or and are further not associated with a player's player tracking account.

In one embodiment, upon an occurrence of an equalizing unit accumulation event, one or more equalizing units are provided to one or more players. Such provided equalizing units are accumulated in association with the player's equalizing unit account. In one such embodiment, an occurrence of an equalizing unit accumulation event and/or a quantity of equalizing units provided is based on calculations using at least one of a number of different suitable algorithms or equations. As described below, such algorithms may be based on one or more of a player's denomination, a player's bet level, an amount of a player's coin-in, one or more symbols or symbol combinations generated, a number or quantity of games played by one or more players, one or more designated thresholds reached, an amount of one or more gaming device's coin-out, one or more game parameters, any combination thereof or any other suitable factor. It should be appreciated that in determining the quantity of equalizing units to provide to the player for different occurrences of different designated events, in one embodiment, the gaming system accounts for the player's specific wagering activity and the specific paytable associated with the player's currently played gaming device. Such considerations enable the gaming system disclosed herein to normalize the earning or distribution of equalizing units to provide equality to players playing different games at different gaming devices. It should be appreciated that any of the embodiments disclosed herein may be mathematically combined in the accumulation of one or more equalizing units and/or the redemption of one or more equalizing units.

Figure 3:
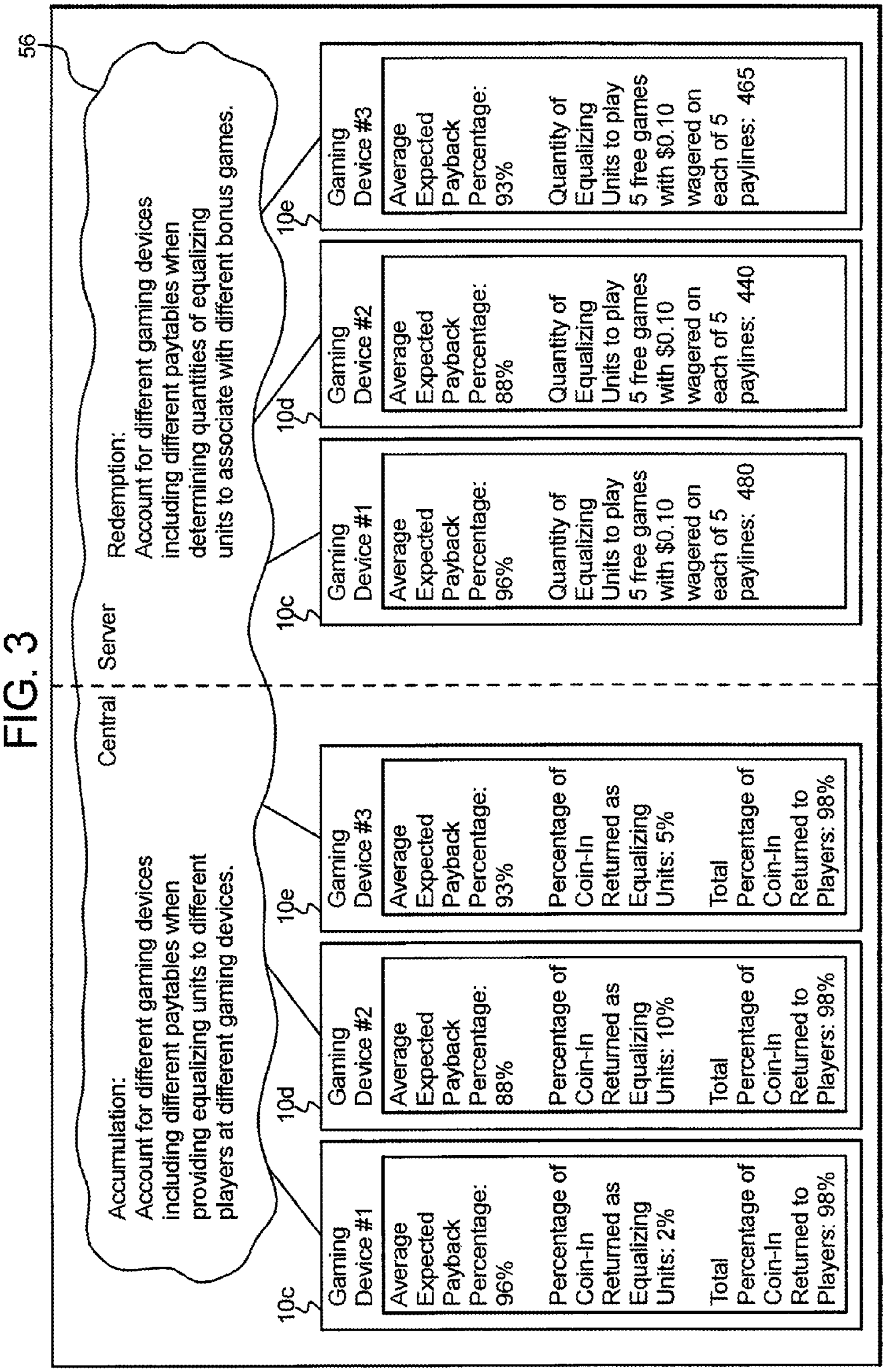
FIG. 3 is a schematic diagram of a plurality of different gaming devices of the gaming system disclosed herein illustrating the utilization of equalizing units to normalize the different aspects of the different gaming devices.

In one such embodiment wherein an equalizing unit accumulation event occurs based, at least in part, on an amount of coin-in, to account for different gaming devices having different payback percentages, the central server adjusts the amounts of equalizing units provided to compensate for the difference in payback percentages. In this embodiment, the central server provides different quantities of equalizing units for the same or substantially the same amount of coin-in placed at different gaming devices. For example, as seen in FIG. 3, if a first game at a first gaming device 10*c* is associated with an average expected payback percentage of 96%, a second game at a second gaming device 10*d* is associated with an average expected payback percentage of 88% and a third game at a third gaming device 10*e* is associated with an average expected payback percentage of 93%, then to normalize the equalizing units provided such that each gaming device provides an average expected total return of 98% of coin-in to the players of these gaming devices, the player playing the first game at the first gaming device is returned an average expected payback percentage of 2% of their coin-in in the form of equalizing units, the player playing the second game at the second gaming device is returned an average expected payback percentage of 10% of their coin-in in the form of equalizing units and the player playing the third game at the third gaming device is returned an average expected payback percentage of 5% of their coin-in in the form of equalizing units. In this example, for the same amount of coin-in, the player playing the second game at the second gaming device is provided five times as many equalizing units as the player playing the first game at the first gaming device and twice as many equalizing units as the player playing the third game at the third gaming device. It should be appreciated that this example embodiment illustrates one manner in which the central server accounts for different gaming devices including different paytables when providing different quantities of equalizing units to different players at different gaming devices.

In another such example illustrating the central server adjusting the amounts of equalizing units to provide to compensate for the difference in payback percentages, a first game at a first gaming device associated with an average expected payback percentage of 85% provides a player 10 equalizing units for every $10 wagered and a second gaming device associated with an average expected payback percentage of 95% provides a player 3 equalizing units for every $10 wagered. In this example, a first player who deposits $100 into the first gaming device with the average expected payback percentage of 85% and plays until the credit meter is $0.00 will theoretically wager a total of $560. This $560 wagered includes 56 equalizing unit accumulation events of $10 wagered and as each equalizing unit for this first gaming device results in the gaming system providing 10 equalizing units, the first player is provided a total of 560 equalizing units. In this example, a second player who deposits $100 into the second gaming device with the average expected payback percentage of 95% and plays until the credit meter is $0.00 will theoretically wager a total of $1890. This $1890 wagered includes 189 equalizing unit accumulation events of $10 wagered and as each equalizing unit for this second gaming device results in the gaming system providing 3 equalizing units, the second player is provided a total of approximately 567 equalizing units. Such a configuration provides for a gaming system which awards the same or substantially the same quantity of equalizing units for the same theoretical loss at different gaming devices over a designated period of time.

In one alternative embodiment wherein the central server adjusts the amounts of equalizing units to provide to compensate for the differences in payback percentages, the gaming system utilizes a random distribution of providing the equalizing units earned. For example, if a player has earned 580 equalizing units at the first gaming system described in the example above, rather than providing the player 10 equalizing units for every $10 wagered, while providing the player their total of 560 earned equalizing units, the first gaming device varies the amounts of equalizing units provided for different amounts wagered based on a weighted table. In this example, after the first $15 is wagered, the first gaming device may provide the player 10 equalizing units and after another $55 is wagered, the first gaming device may provide the player 60 equalizing units. Such a distribution of equalizing units at least partially prevents the player from determining the equalizing units payback percentage and/or paytable of the gaming devices in the gaming system. It should be appreciated that any suitable distribution system may be employed with the gaming system disclosed herein.

In another such embodiment wherein an equalizing unit accumulation event occurs based, at least in part, on an amount of coin-in, the central server determines that a designated percentage or portion of each gaming device's coin-in is provided in the form of equalizing units. In one such embodiment, each gaming device in the gaming system provides the same portion of each gaming device's payback percentage in the form of equalizing units. For example, the central server determines that each gaming device will provide an average expected payback percentage of 3% of coin-in back to players in the form of equalizing units.

In another embodiment, a plurality of gaming devices in the gaming system each provide the same portion of each gaming device's payback percentage in the form of equalizing units. In another embodiment, a plurality of gaming devices in the gaming system each provide a different portion of each gaming device's payback percentage in the form of equalizing units. In different embodiments, the percentage of coin-in that each gaming device returns to players in the form of equalizing units is determined based on an amount of credits won, predetermined, randomly determined, determined based on a random determination by the central controller, determined based on a random determination by one or more gaming devices, determined based on the status of one or more players (such as determined through a player tracking system), determined based on a generated symbol or symbol combination, determined based on one or more side wagers placed, determined based on a player's primary game wager, determined based on the amount of coin-in accumulated in one or more pools, or determined based on any other suitable method or criteria.

In another such embodiment wherein an equalizing unit accumulation event occurs based on an amount of coin-in reaching or exceeding a designated threshold, to account for different gaming devices having different payback percentages, the central server adjusts different thresholds to compensate for the difference in payback percentages. In this example, different gaming devices associated with different payback percentages have different designated threshold amounts of coin-in reached for a player to receive one or more equalizing units. For example, if a default threshold of coin-in to receive an equalizing unit is \$3.00 and a penny gaming device has a payback percentage of 85%, a player at the penny gaming device only needs to wager \$2.55 (\$3.00 threshold×0.85 payback percentage) to receive an equalizing unit. In this example, a player at a nickel gaming device with a payback percentage of 95% only needs to wager \$2.85 (\$3.00 threshold×0.95 payback percentage) to receive an equalizing unit.

In one embodiment, the gaming system sets an expected payout to provide to the player in the form of equalizing units and utilizes the average expected payback percentage for each gaming device to determine the threshold wager amount for that gaming device. This embodiment provides an equitable manner to provide equal monetary value to players at different gaming devices which utilize different average expected payback percentages. For example, a gaming system operator determines that each equalizing unit will have a value of \$0.10 and further determines that for every \$300 wagered (i.e., 30000 monetary units wagered), \$10 is provided back to the player in the form of equalizing units regardless of the paytable at the player's gaming device. In this example, the gaming system or gaming system operator determines that for a first gaming device with an average expected payback percentage of 85%, \$11.76 worth of equalizing units must be played through the first gaming device to provide the player at the first gaming device the determined expected value of \$10.00. As each equalizing unit of this example has a value of \$0.10, this \$11.76 worth of equalizing units equates to 117.65 equalizing units. In this example, the gaming system determines that for every 3000 monetary units wagered, 117.65 equalizing units must be provided to the player and thus for every 255 (30000/117.65) monetary units wagered, 1 equalizing unit is provided to the player at the first gaming device. Accordingly, in this example, the first gaming device is associated with a threshold of 255 monetary units wagered. For a second gaming device in this example with an average expected payback percentage of 95%, the gaming system determines that \$10.53 worth of equalizing units must be played through the second gaming device to provide the player at the second gaming device the determined expected value of \$10.00. As each equalizing unit of this example has a value of \$0.10, this \$10.53 worth of equalizing units equates to 105.3 equalizing units. In this example, the gaming system determines that for every 3000 monetary units wagered, 105.3 equalizing units must be provided to the player and thus for every 285 (30000/105.3) monetary units wagered, 1 equalizing unit is provided to the player at the second gaming device. Accordingly, the second gaming device is associated with a threshold of 285 monetary units wagered.

More specifically, in determining the different designated threshold amounts of coin-in reached for a player to receive one or more equalizing units at different gaming devices with different average expected payback percentages, the gaming system or gaming system operator first assigns values to the variables of percentage contribution desired ($T_{\%}$), a bet or wager value of an equalizing unit ($V_{BU1}$), and the value of the prize to be awarded ($V_{T\$}$). The gaming system operator then determines the total dollar amount bet ($\$_{TB}$) to award ($V_{T\$}$), wherein ($\$_{TB}$)=($V_{T\$}$)/($T_{\%}$). This determined ($\$_{TB}$) needs to be converted to credits (C) to find the total credits bet ($C_{TB}$) to award ($V_{T\$}$). This conversation utilizes the equation of ($C_{TB}$)=($\$_{TB}$)*(C/\$) [credits per dollar].

In this example, the gaming system operator next needs to know the value of total equalizing units awarded ($V_{TU}$) to award ($V_{T\$}$). This requires knowing the game's payback percentage ($\%_{Gx}$), such that ($V_{TU}$)=($V_{T\$}$)/($\%_{Gx}$). The gaming system operator next determines the total number of equalizing units awarded ($A_U$) based on ($V_{BU1}$), wherein ($A_{TU}$)=($V_{TU}$)/($V_{BU1}$). Such determinations lead the gaming system operator to determine the normalizing number for the number of credits bet to award an equalizing unit ($A_{U/C}$), wherein ($A_{U/C}$)=($C_{TB}$)/($A_{TU}$). Accordingly, in determining the different designated threshold amounts of coin-in reached for a player to receive one or more equalizing units at different gaming devices with different average expected payback percentages, the gaming system or gaming system operator utilizes the algorithm of ($A_{U/C}$)=(($V_{U1}$)*(C/\$)*($\%_{Gx}$))/($T_{\%}$). Using the example described above, (\$0.10*100 credits/\$*85%)/(3.33%)=255 credits In another such embodiment, an equalizing unit accumulation event occurs and the central server provides one or more equalizing units based on one or more player's coin-in. In this embodiment, when determining if an equalizing unit accumulation event occurs for one or more players, the central server accounts for different player's playing different gaming devices at different rates. For example, if equalizing units are earned at a 5% rate of coin-in, a player earns one equalizing unit for every 20 units wagered. In this example, Player A is playing a 9 line penny game at one credit per line and Player B is playing a 20 line nickel game at three credits per line. To properly normalize play, the central server analyzes each player's bet into a monetary unit of play based on a penny. Tracking in monetary units accounts for gaming machines having multi-denominations, gaming machines of different denominations and/or gaming machines which accept different currencies. In this example, Player A is betting 9 monetary units per play and Player B is betting 300 monetary units per play. Therefore, based on the different rates of play, the central server normalizes the accumulation of equalizing units such that Player B accrues equalizing units approximately 33.33 times the rate that Player A accrues them. It should be appreciated that the actual rate that equalizing units are provided to players may be defined by the gaming system designer based on any suitable parameters.

In another such embodiment wherein an equalizing unit accumulation event occurs based on an amount of coin-in reaching or exceeding a designated threshold, a player's status in a player tracking system is used to determine one or more parameters of an equalizing unit accumulation event. For example, an equalizing unit accumulation event occurs for a Gold Player after \$20 of coin-in has been wagered by that player, an equalizing unit accumulation event occurs for a Silver Player after $30 of coin-in has been wagered by that player, an equalizing unit accumulation event occurs for a Bronze Player after $40 of coin-in has been wagered by that player and an equalizing unit accumulation event occurs for an uncarded player after $50 of coin-in has been wagered by that player.

In another such embodiment wherein an equalizing unit accumulation event occurs based on an amount of coin-in, each equalizing unit accumulation event is associated with a range of values. In this embodiment, an equalizing unit accumulation event will occur when the amount of coin-in associated with a player (or a group of players) increments to an equalizing unit accumulation event hit value within the range of values associated with that equalizing unit accumulation event. In different embodiments, the equalizing unit accumulation event hit value at which an equalizing unit accumulation event will occur is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In one embodiment, an equalizing unit accumulation event occurs and the central server provides one or more equalizing units based on an elapsed period of time. In this embodiment, after a designated period of time, the central server provides a quantity of equalizing units to one or more players. For example, if a player is actively playing (as described below) a gaming device for five minutes, the central server provides one equalizing unit to the player. In another such embodiment, a designated time is set, such as a time of day, for when an equalizing unit accumulation event will occur. In this embodiment, such a set time may be based on historic data. In different embodiments, the period of time which must elapse for the central server to provide one or more players one or more equalizing units is predetermined, randomly determined, determined based on a random determination by the central controller, determined based on a random determination by one or more gaming devices, determined based on the status of one or more players (such as determined through a player tracking system), determined based on a generated symbol or symbol combination, determined based on one or more side wagers placed, determined based on a player's primary game wager, determined based on the amount of coin-in accumulated in one or more pools, or determined based on any other suitable method or criteria.

In one embodiment, an equalizing unit accumulation event occurs and one or more equalizing units are provided based on an outcome associated with one or more plays of any primary game and/or an outcome associated with one or more plays of any secondary game of the gaming machines in the gaming system. In one such embodiment, the determination of when to cause an equalizing unit accumulation event to occur is symbol driven based on the generation of one or more designated symbols or symbol combinations. In this embodiment, when the designated symbol combination is randomly generated, the equalizing unit accumulation event associated with this symbol-driven event occurs.

In one such embodiment, an equalizing unit accumulation event occurs and the central server provides one or more equalizing units based on one or more specific symbols or symbol combinations or other game events. In this embodiment, certain designated symbols or symbol combinations are each associated with an occurrence of an equalizing unit accumulation event. In operation of one such embodiment, if such designated symbols or symbol combinations are generated, the quantity of equalizing units to provide to the player are included in the game program run by the player's currently played gaming device. In operation of another such embodiment, if such designated symbols or symbol combinations are generated, the gaming device notifies the central server of this generation. The central server determines a quantity of equalizing units, if any, to provide to the player. It should be appreciated that querying the central server to determine a quantity of equalizing units to provide (upon the generation of a designated symbol or symbol combination) provides another way to normalize the distribution of equalizing units. This configuration provides the central server the opportunity to analyze a number of game parameters (such as game type, bet level, payout percentage) of the player's currently played gaming device to determine how many equalizing units to provide to the player (and in turn to determine what percentage payback to return to the player in the form of equalizing units).

For example, the gaming system or gaming system operator sets up parameters such that 1% of payback will be returned to the player in the form of equalizing units based on generated symbol combinations. In this example, if the paytable is set such that the specific designated symbol combination will occur approximately every 100 games, then the central server determines that if the designated symbol combination is generated (i.e., an occurrence of an equalizing unit accumulation event), the gaming device provides the player a quantity of equalizing units relative to their bet. In another example, the gaming system or gaming system operator sets up parameters such that 1% of payback will be returned to the player in the form of equalizing units based on generated symbol combinations. In this example, if the paytable is set such that the specific designated symbol combination will occur approximately every 200 games, then the central server determines that if the designated symbol combination is generated (i.e., an occurrence of an equalizing unit accumulation event), the gaming device provides the player a quantity of equalizing units relative to twice or 2× their bet. In another example, if the percentage the gaming system operator wants to return to players in the form of equalizing units is modified to 0.5% of payback, the central server determines that if the designated symbol combination is generated (at a rate of 1/100), the gaming device provides the player a quantity of equalizing units relative to 50% of the player's bet.

In one embodiment, if the generated designated symbol or symbol combination is associated with a bonus game, the gaming device proceeds in providing the bonus game to the player wherein a quantity of equalizing units (and no credits) are provided in the bonus game. In another embodiment, if the generated designated symbol or symbol combination is associated with a bonus game, the gaming device proceeds in providing the bonus game to the player wherein, in addition to any credits provided in the bonus game, a quantity of equalizing units are provided. In another embodiment, if the generated designated symbol or symbol combination is associated with a bonus game, the gaming device does not necessarily trigger a bonus game, but causes the central server to determine if any bonus game is provided to the player in addition to any quantity of equalizing units provided. In one such embodiment, the quantity of equalizing units provided in the bonus game is stored in the game program at the gaming device. In another such embodiment, the quantity of equalizing units provided in the bonus game are determined by the central server and communicated to the gaming device. In different embodiments, the bonus game provided is specific to the gaming device, specific to the primary game played, specific to a game theme, a generic bonus game, an independent bonus game or any suitable bonus game.

In another embodiment, an equalizing unit accumulation event occurs and the central server provides one or more equalizing units based on an amount of coin-out at a gaming device. In one such embodiment, all coin-out at a gaming device is analyzed to determine the quantity of equalizing units to provide. For example, the gaming system determines that 5% of all coin-out is turned into equalizing units, such that a win of 20 credits results in 1 equalizing unit. In different embodiments, the percentage of coin-out converted to equalizing units is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In one such embodiment wherein an equalizing unit accumulation event occurs based, at least in part, on an amount of coin-out, to account for different gaming devices having different payback percentages, the central server adjusts the amounts of equalizing units provided to compensate for the difference in payback percentages. In this embodiment, the central server provides different quantities of equalizing units for the same or substantially the same amount of coin-out provided at different gaming devices. For example, if a first game at a first gaming device is associated with an average expected payback percentage of 85% and a second game at a second gaming device is associated with an average expected payback percentage of 95%, then to normalize the equalizing units provided based on game payback percentages, for the same amount of coin-out, the player playing the first game at the first gaming device earns more equalizing units than the player playing the second game at the second gaming device.

In another such embodiment, the gaming system includes a coin-out threshold wherein equalizing units are provided based on an amount of coin-out greater than the coin-out threshold. For example, the gaming system determines that 5% of all coin-out is turned into equalizing units for wins greater than 100 credits, such that a win of 20 credits results in 0 equalizing units and a win of 100 credits results in 5 equalizing units. In one such embodiment, as the player increase their wager amount, the threshold increases accordingly. In different embodiments, the applicable coin-out threshold is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In one such embodiment wherein an equalizing unit accumulation event occurs based on an amount of coin-out reaching or exceeding a coin-out threshold, the gaming system analyzes the applicable paytable to determine what percentage of wins are over the threshold to determine how much the payback percentage is to increment. This embodiment rewards players who maximize their wager as higher wager amounts equal larger payouts (thus higher quantities of provided equalizing units) and are more likely to result in wins over the set threshold amount. In another such embodiment, a player's status in a player tracking system is used to determine one or more parameters of an equalizing unit accumulation event. For example, an equalizing unit accumulation event occurs for a Gold Player after a $5 win, an equalizing unit accumulation event occurs for a Silver Player after an $8 win, an equalizing unit accumulation event occurs for a Bronze Player after a $10 win and an equalizing unit accumulation event occurs for an uncarded player after a $20 win.

In one embodiment, at least one and preferably a plurality of equalizing unit accumulation events occur in an apparently random fashion as perceived by the players of these gaming machines. In one embodiment, the gaming devices do not provide any apparent reasons to the players for the occurrences of such equalizing unit accumulation events. In this embodiment, causing an equalizing unit accumulation event to occur is not triggered by an event in the primary game or based specifically on any of the plays of any primary game or on any of the plays of any secondary game of the gaming machines in the system. That is, these equalizing unit accumulation events are caused without any explanation or alternatively with simple explanations.

In another alternative embodiment, an equalizing unit accumulation event occurs based on a predefined variable reaching a defined parameter threshold. For example, an equalizing unit accumulation event occurs when the $500^{th}$ different player has played a gaming machine associated with one of the progressive awards (ascertained from a player tracking system). In different embodiments, the predefined parameter thresholds include a length of time, a length of time after a certain dollar amount is hit, a wager level threshold for a specific machine (which gaming device is the first to contribute $25), a number of gaming machines active, or any other parameter that defines a suitable threshold.

In another embodiment, an equalizing unit accumulation event occurs based upon gaming system operator defined player eligibility parameters stored on a player tracking system (such as via a player tracking card or other suitable manner). For example, a gaming system operator may choose to only enable players of the highest player tracking status to be eligible for an equalizing unit accumulation event. In this embodiment, the parameters for eligibility are defined by the gaming system operator based on any suitable criterion. In one embodiment, the central controller/gaming device processor recognizes the player's identification (via the player tracking system) when the player inserts their player tracking card in the gaming machine. The central server/gaming device processor determines the player tracking level of the player and if the current player tracking level defined by the gaming system operator is eligible for an equalizing unit accumulation event to occur. In one embodiment, the gaming system operator defines minimum bet levels required for the equalizing unit accumulation event occurs based on the player's card level. In this embodiment, different bet amounts are required to be eligible to cause different equalizing unit accumulation events to occur. In another embodiment, different side bets or side-wager amounts are required to cause different equalizing unit accumulation events to occur. Once the central controller/gaming device processor determines which players are eligible, any suitable method for causing the equalizing unit accumulation event to occur may be employed.

Another embodiment for determining if an equalizing unit accumulation event occurs includes a system determination, wherein the equalizing unit accumulation event occurs due to a random selection by the central controller. In one embodiment, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria).

In one such embodiment, based on the gaming machine's state, the central controller determines which of these gaming machines causes an equalizing unit accumulation event to occur. In one embodiment, the gaming machine which has been classified as active the longest since the last equalizing unit accumulation event is provided a quantity of equalizing units. In another embodiment, the determination of if an equalizing unit accumulation event will occur is based on the relative proportion of gaming/wagering activity at each gaming device in the gaming system. In this embodiment, the player who consistently places a higher wager is more likely to cause an equalizing unit accumulation event to occur than a player who consistently places a minimum wager.

In another embodiment, an equalizing unit accumulation event occurs based on a determination if any numbers allotted to a gaming device match a randomly selected number. In this embodiment, upon or prior to each play of each gaming machine, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine causes an equalizing unit accumulation event to occur.

In one embodiment, the central controller and an individual gaming machine work in conjunction with each other to determine if an equalizing unit accumulation event occurs, for example through an individual gaming machine meeting a predetermined requirement or criteria established by the central controller. In another embodiment, an individual gaming machine may determine when an equalizing unit accumulation event occurs. In another embodiment, an individual gaming machine may determine when at least one equalizing unit accumulation event occurs and the central controller determines when at least one equalizing unit accumulation event occurs. It should be appreciated that any suitable determination of determining if an equalizing unit accumulation event occurs may be implemented in accordance with the gaming system disclosed herein.

In another embodiment, the gaming system enables a player to purchase a designated quantity of equalizing units. In this embodiment, rather than accumulating equalizing units based on one or more aspects of game play, the gaming system enables the player to directly purchase one or more equalizing units. In different embodiments, the quantity of equalizing units which the player may purchase and/or the cost of each purchased equalizing unit is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In one embodiment, the value associated with each equalizing unit is determined by a gaming system operator. In this embodiment, the gaming system operator creates a base value for each equalizing unit and determines the quantities of units to provide for different games, or different events based on this base value and the value of such games, or such events. In one such embodiment, to avoid player's misconception that one equalizing unit is equal to one credit, the gaming system operator significantly discounts the value of each equalizing unit relative to each credit. For example, one-hundred equalizing units have the same combined inherent value as one credit. In another embodiment, the value associated with each equalizing unit is determined by the central server.

In another embodiment, an equalizing unit accumulation event occurs in association with a promotion. In this embodiment, the central server provides one or more equalizing units to a player for accepting or participating in a promotion. For example, in exchange for signing up for a gaming establishments player loyalty club, for visiting a gaming establishments website or some activity thereon, such as learning about a new game, or for trying a new game, the central server provides one or more equalizing units to a player. In another embodiment, the central server is configured to provide a player modified quantities of equalizing units for an equalizing unit accumulation event occurring in association with a promotion. For example, during a designated promotion time at a gaming establishment, the central server provides a player double equalizing units compared to the quantity of equalizing units the player would have received during the non-promotion time. In another embodiment, an equalizing unit accumulation event occurs in association with a player purchasing one or more items. For example, in exchange for purchasing a trip to a gaming establishment buffet, the central server provides one or more equalizing units to a player.

It should be appreciated that in such embodiments, the gaming system operator creates a base value for each equalizing unit and determines the quantities of units to provide for different events or occurrences based on this base value and the value of such events or occurrences. In different embodiments, the quantity of equalizing units provided in exchange for participating in a promotion or purchasing an item is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In different embodiments, one equalizing unit accumulation events may occur for each play of a primary game, each generated game outcome, each central server determination or any combination thereof. In different embodiments, a plurality of equalizing unit accumulation events may occur for each play of a primary game, each generated game outcome, each central server determination or any combination thereof. In one such embodiment, each play of a primary game provides the player multiple opportunities to accumulate equalizing units. For example, for one play of a primary game, the initiation of the play of the primary wagering game may cause a first equalizing unit accumulation event which results in an accumulation of a quantity of equalizing units, the player wagering on a designated number of paylines may cause a second equalizing unit accumulation event which results in an accumulation of a quantity of equalizing units and the player placing a designated side bet may cause a third equalizing unit accumulation event which results in an accumulation of a quantity of equalizing units. Accordingly, in association with a play of a primary game (or alternatively in association with a play of a secondary game) a plurality of events may occur which result in a plurality of quantities of equalizing units provided to the player.

In one embodiment, the gaming machines of the gaming system are operable to cause multiple equalizing unit accumulation events to occur for multiple players at the multiple linked gaming machines at the same time or substantially the same time. Alternatively, the gaming machines of the gaming system are operable to cause multiple equalizing unit accumulation events to occur for multiple players at the multiple linked gaming machines in an overlapping or sequential manner. In one such embodiment, an occurrence of an equalizing unit accumulation event results in a plurality of players each receiving one or more equalizing units. In another such embodiment, a plurality of these players receive the same amount of equalizing units. In another such embodiment, each of these players receives the same amount of equalizing units. In another such embodiment, a plurality of these players receive different amounts of equalizing units. In another embodiment, each of these players receives a different amount of equalizing units.

In one embodiment, upon at least one occurrence of an equalizing unit accumulation event, one equalizing unit is provided to a player. In another embodiment, upon at least one occurrence of an equalizing unit accumulation event, a plurality of equalizing units are provided to a player. In one such embodiment, the quantity or amount of equalizing units provided to a player is predetermined upon the occurrence of an equalizing unit accumulation event. In another embodiment, the quantity or amount of equalizing units provided to a player is randomly determined upon the occurrence of an equalizing unit accumulation event. In one embodiment, for a plurality of gaming devices in the gaming system, the same amount of equalizing units are provided for each occurrence of an equalizing unit accumulation event. In another embodiment, for a plurality of gaming devices in the gaming system, different amounts of equalizing units are provided for each occurrence of an equalizing unit accumulation event.

In another embodiment, upon the occurrence of an equalizing unit accumulation event, the quantity or amount of equalizing units provided to a player is based on that player's status in a player tracking system. For example, upon an occurrence of an equivalent equalizing unit accumulation event for a plurality of players, a Gold Player is provided forty equalizing units, a Silver Player is provided thirty equalizing units, a Bronze Player is provided twenty equalizing units and an uncarded player is provided ten equalizing units.

In different embodiments, upon the occurrence of an equalizing unit accumulation event, the quantity or amount of equalizing units provided to a player is determined based on a generated symbol or symbol combination, determined based on a determination by the central controller, determined based on a determination by one or more gaming devices, determined based on one or more side wagers placed, determined based on a player's primary game wager, determined based on time (such as the time of day), determined based on the amount of coin-in accumulated in one or more pools, or determined based on any other suitable method or criteria.

In another embodiment, upon the occurrence of an equalizing unit accumulation event, the quantity or amount of equalizing units provided is determined based on an average expected quantity of equalizing units for the specific equalizing unit accumulation event. For example, if an equalizing unit accumulation event occurs upon the generation of a cherry-cherry-cherry symbol combination and the cherry-cherry-cherry symbol combination is associated with an average expected quantity of 100 equalizing units, the gaming device/central server enables the player to pick one of the generated cherry symbols. In this embodiment, one cherry symbol is associated with 75 equalizing units, another cherry symbol is associated with 100 equalizing units and another cherry symbol is associated with 125 equalizing units (i.e., the three cherry symbols have an average quantity of 100 equalizing units) and the gaming device provides the player the quantity of equalizing units associated with the selected cherry symbol. This example provides an increased level of volatility and a player selection aspect to determining a quantity of equalizing units to provide to the player. It should be appreciated that any suitable equalizing unit accumulation event sequence, such as any game described herein, may be implemented in determining the quantity of equalizing units to provide to the player.

In another embodiment, accumulated equalizing units are associated with an expiration date and time. In this embodiment, the gaming system/gaming device is configured to communicate to the player the proximity of the expiration of any stored equalizing units (i.e., "your equalizing units will expire at 6:00 am tomorrow"). In one embodiment, such notice of expiration of stored equalizing units is at the player's currently played gaming device. In another embodiment, such notice of expiration of stored equalizing units is external from the player's currently played gaming device, such as via e-mail. In different embodiments, equalizing units accumulated at different times are redeemed in order of expiration (first to expire shows first), or in order of first earned basis.

In one embodiment, any accumulated equalizing units are stored or escrowed for the player independent of the player's player tracking account. In this embodiment, the stored data includes, but is not limited to, the player's name, the player's equalizing unit account number, the date/time of earning the equalizing units, any expiration of the stored equalizing units, and/or any other suitable criteria. In another embodiment, any accumulated equalizing units are stored in association with a player's player tracking account. In this embodiment, the stored data includes, but is not limited to, the player's name, the player's player tracking account number, the date/time of earning the equalizing units, any expiration of the stored equalizing units, and/or any other suitable criteria In one embodiment, after the gaming system provides a designated quantity of equalizing units to one or more players, the gaming system enables certain qualifying players to redeem different quantities of accumulated equalizing units for one or more plays of one or more games, such as a primary game or a bonus game. In an alternative embodiment, after the gaming system provides a designated quantity of equalizing units to one or more players, the gaming system enables certain qualifying players to redeem different quantities of accumulated equalizing units for one or more modifications to designated features in one or more plays of one or more games.

In one such embodiment, to account for enabling the player to selectively participate in one or more of the different suitable games associated with different suitable gaming devices of the gaming system, the central server determines the parameters of the available games based on the quantity of accumulated equalizing units, the player's specific wagering activity and the specific paytable associated with the selected game. Since the player may select to play any suitable game associated with the gaming system (and thus utilize the paytable of any suitable game in the gaming system), in determining the quantity of equalizing units which must be redeemed for each available game, the central server must account for the paytable of the specific game selected by the player, including the average expected payout of each game played. Such a gaming system enables each player to redeem the appropriate quantity of equalizing units to participate in (i.e., obtain a chance to win) any game available through the gaming system without having to seek out a specific gaming machine or wait until it becomes available.

In one embodiment, determining a quantity of equalizing units to redeem specific to the parameters of the selected game enables the central server to provide the player a suitable game associated with any suitable gaming device in the gaming system. For example, if a player selects to play a first game associated with a gaming device in the gaming system, the gaming system determines and utilizes a first quantity of equalizing units which must be redeemed to play that first game (i.e., based on the player's bet and the paytable associated with the first game). In this example, if the player selects to play a second game associated with another gaming device in the gaming system, the gaming system determines and utilizes a second, different quantity of equalizing units which must be redeemed to play that second game (i.e., based on the players bet and the paytable associated with the second game). Such a configuration provides that the central server is operable to determine a quantity of equalizing units to redeem in association with any game available in the gaming system and thus a player may redeem their accumulated equalizing units in association with any play of any suitable game at any suitable gaming device in the gaming system.

In one embodiment, the central server determines the quantity of equalizing units which must be redeemed to participate in each available different game based on the average expected payout for that game. In other words, the equalizing unit cost of each play of each game is based, at least in part, on the expected benefit to the player. For example, a first game with an average expected payout of $50 is associated with 7,500 redeemed equalizing units (i.e., costs the player 7,500 equalizing units to participate) and a second game with an average expected payout of $100 is associated with 15,000 redeemed equalizing units (i.e., costs the player 15,000 equalizing units to participate). Such a configuration provides an additional avenue to normalize the costs of different available games associated with different gaming devices in the gaming system.

In another example of this configuration, as illustrated in FIG. 3, a first game at a first gaming device 10*c* is associated with an average expected payback percentage of 96%, a second game at a second gaming device 10*d* is associated with an average expected payback percentage of 88% and a third game at a third gaming device 10*e* is associated with an average expected payback percentage of 93%. To normalize the different average expected payback percentages of these different gaming devices, the central server determines a quantity of equalizing units which must be redeemed based on the average expected payout for each game played and the value of each equalizing units. In this example, the central server determines that for a player to play five free games with $0.10 wagered on each of five paylines at the first gaming device (i.e., $0.50 wagered per game for 5 games equals a total wager of $2.50), when accounting for the $2.40 average expected payout of these five games ($2.50×96%) and a $0.005 value of each equalizing unit, 480 ($2.40/$0.005) equalizing units must be redeemed by the player at the first gaming device to play such games. In this example, the central server further determines that 440 equalizing units must be redeemed by a player to play five free games with $0.10 wagered on each of five paylines at the second gaming device and 465 equalizing units must be redeemed by a player to play five free games with $0.10 wagered on each of five paylines at the third gaming device.

More specifically, to normalize the quantities of equalizing units which must be redeemed at different gaming devices with different average expected payback percentages, the gaming system or gaming system operator first assigns values to the variables of the redemption value of an equalizing unit ($V_{RU1}$) and the value of the bets or wagers to be awarded ($V_{B\$}$). One example of ($V_{B\$}$) is the number of games played times the bet on each game; so if a player redeems 5 games at $0.50 each (5 lines at $0.10 per line), the ($V_{B\$}$) is $2.50. The gaming system or gaming system operator next determines the total dollar value of the redemption ($V_{T\$}$) based on the game payout percentage, such as ($V_{T\$}$)=($V_{B\$}$)*($\%_{T\$}$). To determine the normalized redemption cost in credits ($R_C$), the equation or algorithm of $(R_C)=(V_{T\$})/(V_{RU1})$, such that $(R_C)=(V_{B\$})*(\%_{Gx})/(V_{RU1})$. In the example described above, if the redemption value is $0.005 per equalizing unit, and the total value wagered is $2.50, at a gaming device with a 96% average expected payback percentage, the equalizing unit redemption cost is ($2.50*96%/$0.005) or 480 equalizing units. It should be appreciated that this example embodiment illustrates one manner in which the central server accounts for different gaming devices including different paytables when determining the quantities of equalizing units to associate with different games.

In another embodiment, in determining the quantity of equalizing units to associate with a participation in each available game, the gaming system accounts for one or more parameters of a player's current or previous game play. In one such embodiment, the gaming system adjusts the equalizing unit cost associated with one or more games based on the average wager of the player during a designated period of time, such as a gaming session. In one such embodiment, the gaming system adjusts the equalizing unit cost associated with one or more games based on the player's status identified from a player tracking system. In different embodiments, the gaming system adjusts the equalizing unit cost associated with one or more games based on a generated symbol or symbol combination, a determination by the central controller, a determination by one or more gaming devices, one or more side wagers placed, a player's primary game wager, time (such as the time of day), an amount of coin-in accumulated in one or more pools, or any other suitable method or criteria.

In another embodiment, the gaming system provides a plurality of types of games available to the player (in exchange for a quantity of redeemed equalizing units) based upon the player's accumulated equalizing units. In this embodiment, the gaming system enables the player the option of choosing which of a plurality of suitable games they wish to spend their accumulated equalizing units on. For example, in exchange for a set quantity of 50,000 equalizing units, the gaming device enables the player to play either 10 free spins at a multiplier of 5× or 50 free spins at a multiplier of 1×. It should be appreciated that in this example embodiment, in determining the number of free spins to provide to the player in redemption of a quantity of equalizing units, the central server must account for the average expected payout or value of each free spin (which is based on the selected game and the paytable utilized for each free spin, wherein the paytable utilized is based on the player's wager amount, bet level and denomination) and equate this value or amount to a quantity or amount of redeemed equalizing units.

In one embodiment, the player's currently played gaming device communicates information or data to the central server regarding that gaming device and the central server determines if an equalizing unit accumulation event occurs, a quantity of equalizing units to accumulate for the player, and/or a quantity of equalizing units to associate with one or more available games based on this communicated information or data.

In another embodiment, when the central server communicates or downloads information or data relating to the currently played game program to the gaming device, the central server communicates certain information, such as the denomination or paytable utilized, to a separate equalizing unit processor or module which stores such information. In another embodiment, the central server periodically checks which games are being played on one or more gaming devices and communicates information or data resulting from these checks to the equalizing unit processor or module. In these embodiments, as the player tracking system monitors certain aspects of the games played at one or more gaming devices, the player tracking system communicates certain information, such as the amounts wagered, to the equalizing unit processor. In this embodiment, the equalizing unit processor or module accesses this communicated information when determining if an equalizing unit accumulation event occurs, a quantity of equalizing units to accumulate for the player, and/or a quantity of equalizing units to associate with one or more available games.

In another embodiment, one or more tasks run by the equalizing unit processor or module or run by the player tracking system are run by the central server. In one such embodiment, when the central server communicates or downloads information or data relating to the currently played game program to the gaming device, the central server logs in and/or stores the appropriate information. In another such embodiment, the central server periodically checks which games are being played on one or more gaming devices and stores information or data resulting from these checks. In these embodiments, when determining if an equalizing unit accumulation event occurs, a quantity of equalizing units to accumulate for the player, and/or a quantity of equalizing units to associate with one or more available games, the central server accesses this logged in and/or stored information or data.

Figure 4:
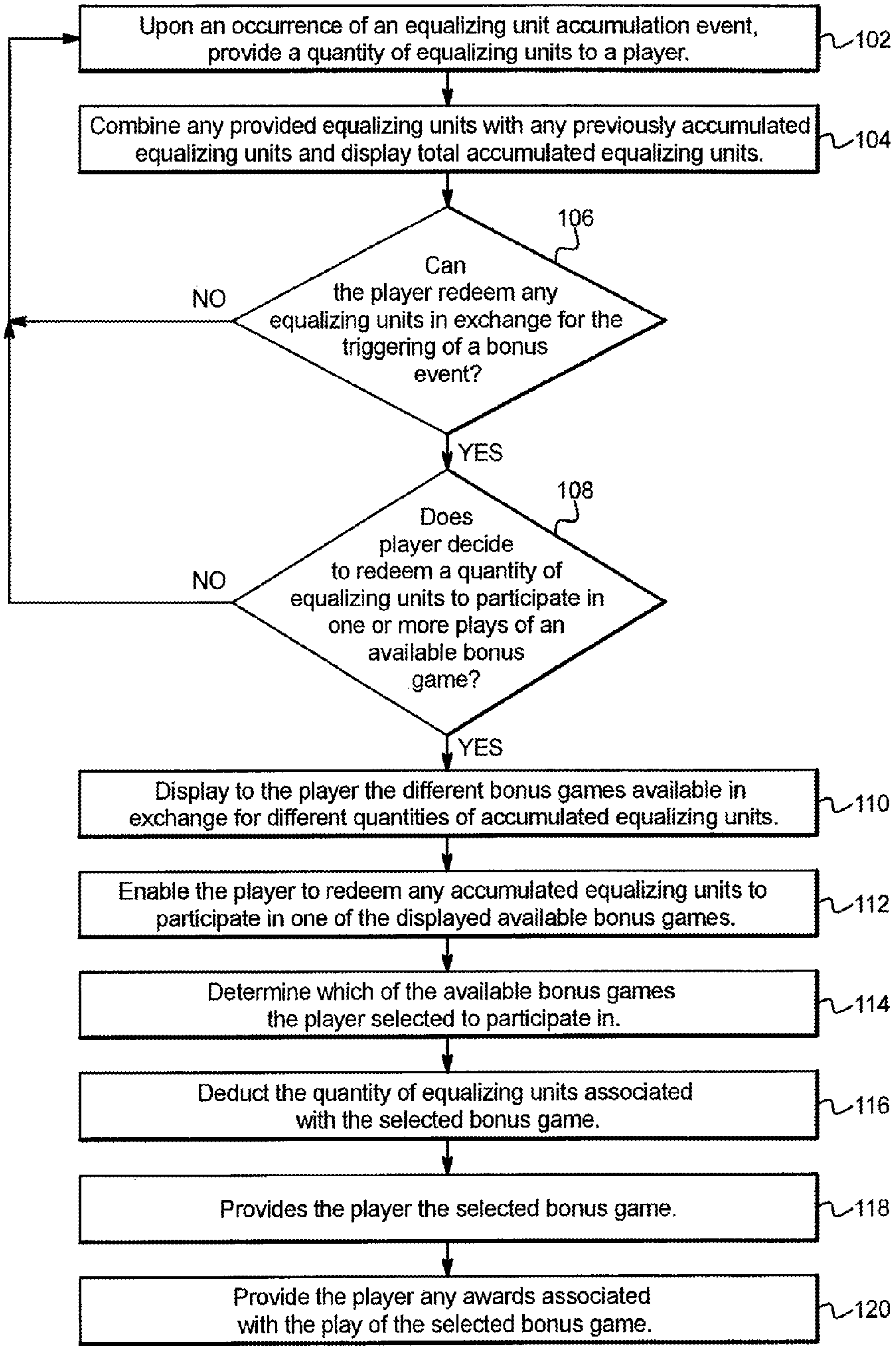
FIG. 4 is a flowchart of one embodiment of the gaming system disclosed herein illustrating a player accumulating equalizing units and redeeming a quantity of equalizing units for a play of a bonus game.

In operation of one example embodiment of the gaming system disclosed herein, as indicated in block 102 of FIG. 4, upon an occurrence of an equalizing unit accumulation event, one or more equalizing units are provided to one or more players. For example, if a coin-in threshold to cause an equalizing unit accumulation event to occur is 100 credits wagered, then upon the player's coin-in for their current gaming session reaching 100 credits wagered (i.e., the occurrence of an equalizing unit accumulation event), the gaming system accumulates 50 equalizing units in an equalizing unit player account associated with the player.

After providing the player one or more equalizing units, any provided equalizing units are combined with any previously accumulated equalizing units and the total accumulated equalizing units are displayed as illustrated in block 104 of FIG. 4. In this example, the 50 accumulated equalizing units are combined with the player's previously accumulated 5120 equalizing units to result in a total of 5170 accumulated equalizing units in the player's equalizing unit player account.

Figure 5:
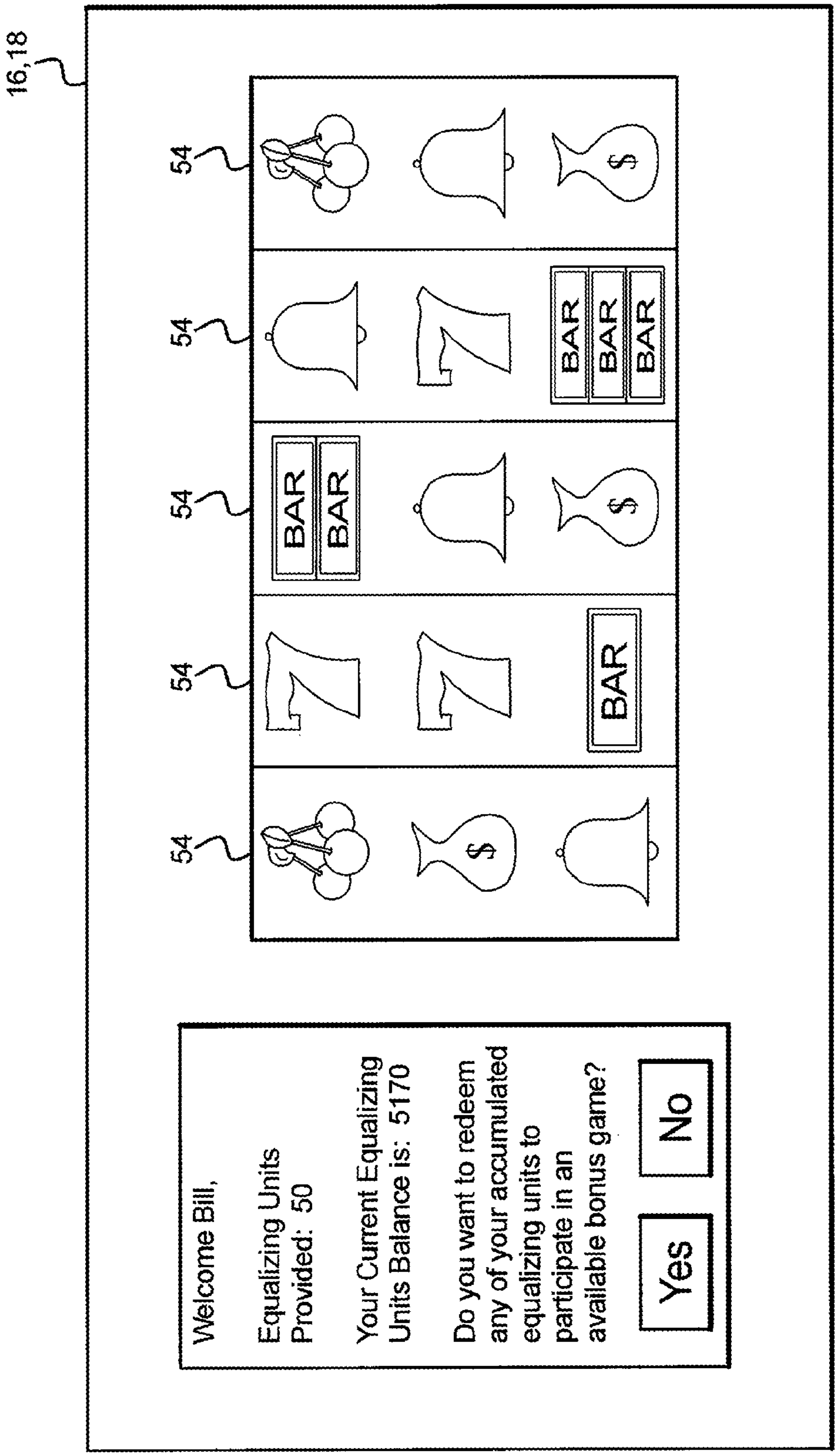
FIG. 5 is an enlarged elevation view of one embodiment of a gaming device of the gaming system disclosed herein illustrating an occurrence of an equalizing units accumulation event and a display of a player's accumulated equalizing units.

In one embodiment, the gaming device displays to the player the current balance of accumulated equalizing units in their equalizing unit player account. In one such embodiment, the gaming device utilizes one or more service windows to display to the player their current balance of accumulated equalizing units. As illustrated in FIG. 5, the gaming device displays to the player information regarding the recently provided 50 equalizing units as well as the 5170 total accumulated equalizing units. Appropriate messages such as "WELCOME BILL" "EQUALIZING UNITS PROVIDED: 50" and "YOUR CURRENT EQUALIZING UNITS BALANCE IS: 5170" may be provided to the player visually, or through suitable audio or audiovisual displays. In another embodiment, the gaming system enables a player to monitor or check their current balance of accumulated equalizing units in their equalizing unit player account. In this embodiment, the gaming device enables the player to interrupt their currently played primary or base game to access the service window to monitor their status regarding accumulated equalizing units.

In one embodiment, as illustrated in diamond 106 of FIG. 4, the gaming system determines whether to enable the player to redeem any equalizing units in exchange for the triggering of a bonus event. In one such embodiment, this determination is based on if the player's accumulated equalizing units is at least equal to the minimum quantity of equalizing units associated with any of the available bonus events. In different embodiments, this determination is predetermined, randomly determined, determined based on a random determination by the central controller, determined based on a random determination by one or more gaming devices, determined based on the status of one or more players (such as determined through a player tracking system), determined based on a generated symbol or symbol combination, determined based on one or more side wagers placed, determined based on a player's primary game wager, determined based on the amount of coin-in accumulated in one or more pools, or determined based on any other suitable method or criteria.

If the gaming system determines not to enable the player to redeem any equalizing units in exchange for the triggering of a bonus event, the gaming system proceeds with any suitable game play as disclosed herein and awaits an occurrence, if any, of another equalizing unit accumulation event.

If the gaming system determines to enable the player to redeem any equalizing units in exchange for the triggering of a bonus event, the gaming system enables the player to decide whether to redeem a quantity of equalizing units to participate in one or more plays of a game, such as a bonus game, as seen in diamond 108 of FIG. 4. In the above described example, as illustrated in FIG. 5, since the player's 5170 accumulated equalizing units is greater than the minimum quantity of equalizing units associated with any of the available bonus events (i.e., 500 accumulated equalizing units as described below), the gaming system enables the player to decide whether to participate in one or more plays of a game in exchange for a quantity of accumulated equalizing units. Appropriate messages such as "DO YOU WANT TO REDEEM ANY OF YOUR ACCUMULATED EQUALIZING UNITS TO PARTICIPATE IN AN AVAILABLE BONUS GAME" may be provided to the player visually, or through suitable audio or audiovisual displays.

If the player decides not to participate in one or more plays of a bonus game in exchange for a quantity of accumulated equalizing units, the gaming system proceeds with any suitable game play as disclosed herein. In one embodiment, at designated intervals, such as based on a suitable sampling rate, the gaming system periodically enables the player to decide to participate in one or more plays of a bonus game in exchange for a quantity of accumulated equalizing units.

On the other hand, if the player decides to participate in one or more plays of a game in exchange for a quantity of accumulated equalizing units (or at least examine the different bonus game options available), the gaming system displays to the player the different bonus games, bonus events or bonus sequences available to the player in exchange for different quantities of accumulated equalizing units as seen in block 110 of FIG. 4. In one embodiment, the gaming system displays to the player the equalizing unit cost associated with each game. In this embodiment, this display of the different games and their respective equalizing unit costs is communicated from the central server and displayed to the player at the gaming device.

In one embodiment, the gaming device displays a table, chart or matrix-type configuration that includes all available game options and the associated equalizing unit costs with each option. In one such embodiment, the gaming device determines which games are available based on the player's accumulated equalizing units. In this embodiment, the gaming device only displays games which are associated with equalizing unit costs less than or equal to the player's accumulated equalizing units. In another embodiment, the gaming device displays games which are associated with equalizing unit costs greater than the player's accumulated equalizing units to inform the player about games potentially available if the player accumulated additional equalizing units.

In one embodiment, as described below, the central server determines the quantity of equalizing units which must be redeemed to participate in each available different game based on the average expected payout for that game. In other words, the equalizing unit cost of each play of each game is based, at least in part, on the expected benefit to the player. Such a configuration provides an additional avenue to normalize the costs of different available games associated with different gaming devices in the gaming system.

In one embodiment, the bonus game offerings and associated equalizing unit costs are set to incorporate the game play parameters or features currently activated. For example, as seen in FIG. 6A, if the player is currently playing a penny reel game with a wager of $0.10 on each of five different paylines, the gaming device displays a matrix 150*a* of the different quantities of equalizing units which must be redeemed for different numbers of free spins with different applicable multipliers. In this example, amongst other available bonus sequences, the gaming device displays that fifty free spins with an applicable multiplier of 1× is associated with 5000 redeemed equalizing units, twenty free spins with an applicable multiplier of 2× is associated with 4000 redeemed equalizing units and ten free spins with an applicable multiplier of 5× is associated with 5000 redeemed equalizing units. It should be appreciated that in this example, since the fifty free spins with an applicable multiplier of 1× and the ten free spins with an applicable multiplier of 5× are each associated with the same number of redeemed equalizing units, these two bonus sequences are associated with the same or substantially the same average expected payout.

In one embodiment, the gaming system enables the player to change one or more game play parameters or features, such as the amount of credits wagered per payline, which they want to be applied to the game. In this embodiment, if the player changes at least one parameter or game feature of at least one available game, the central server may dynamically modify or change the quantity of equalizing units which must be redeemed in associated with the modified or changed game. For example, as seen in FIG. 68, if the player modifies the parameters of the currently played game by increasing the amount wagered per payline to $1.00, the gaming system modifies the different quantities of equalizing units which must be redeemed for different numbers of free spins with different applicable multipliers. In this example, the gaming device displays that after the game parameter modification, the only bonus game in the matrix display 150*b* which the player has enough equalizing units for is five free spins with an applicable multiplier of 1× at an associated equalizing units cost of 5000 equalizing units redeemed. In this example, as the player increased the wager per line applied to the selected game, the average expected payout for that selected game increased and accordingly the central server increased the quantity of equalizing units which must be redeemed in association with the selected game. In another embodiment, the game offerings and associated equalizing unit costs are set to incorporate the game play parameters or features maintained during the player's accumulation of equalizing units, such as the player's average bet level maintained while accumulating equalizing units.

After displaying to the player the different games available at the different equalizing unit costs, the gaming device enables the player to redeem any accumulated equalizing units to participate in one of the available bonus games as illustrated in block 112 of FIG. 4. In this embodiment, the gaming system enables the player to cause an equalizing unit redemption event to occur by selectively utilizing their accumulated equalizing units to determine what games to participate in and when to participate in such games.

The gaming system determines which of the available bonus games the player selected to participate in and deducts the quantity of equalizing units associated with the selected bonus game from the player as illustrated in blocks 114 and 116. In this example, the player selected to participate in the game of five free spins with an applicable multiplier of 3× at an associated equalizing units cost of 1500 equalizing units redeemed.

After deducting the appropriate quantity of equalizing units from the player, the gaming system provides the player the selected bonus game and provides the player any awards associated with the play of the selected bonus game as illustrated in blocks 118 and 120.

Figures 7A, 7B:
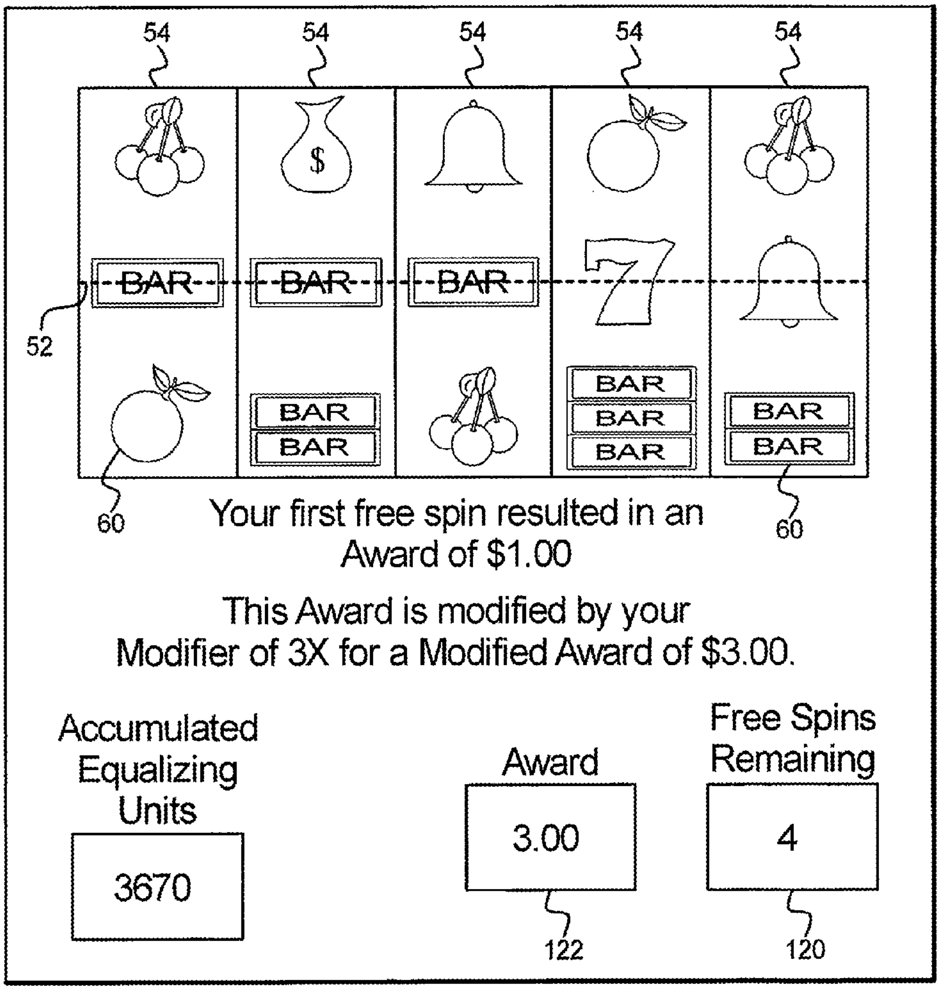
FIG. 7A is a front-side perspective view of one embodiment of a gaming device of the gaming system disclosed herein illustrating a selected free spin bonus game provided to a player.
FIG. 7B is a chart illustrating the results of the selected free spin bonus game of FIG. 7A.

For example, as illustrated in FIG. 7A, after the 1500 equalizing units are deducted from the player's accumulated equalizing units meter (as seen in the accumulated equalizing units meter 152), the game provides the player the first of the player's selected five free spins with the applicable multiplier of 3×. For the first free spin of the selected bonus game, the gaming device generated a plurality of symbols and the gaming device provided the player the award amount of $1.00 associated with the generated symbol combination of bar symbol—bar symbol—bar symbol generated on active payline 52. This award amount is modified by the applicable modifier of 3× to result in a modified of award of $3.00 provided to the player (as seen in award meter or indicator 122). Appropriate messages such as "YOUR FIRST FREE SPIN RESULTED IN AN AWARD OF $1.00" and "THIS AWARD IS MODIFIED BY YOUR MODIFIER OF 3× FOR A MODIFIED AWARD OF $3.00" may be provided to the player visually, or through suitable audio or audiovisual displays.

In this example, since at least one free spin remained in the selected game, the gaming device provided the player an additional free spin. As illustrated in FIG. 7B, the gaming device continued providing the player free spins in the game until all five free spins are provided to the player. After providing the player all five free spins of the game, the gaming device communicates a completion message to the central server and returns to a normal game play mode. It should be appreciated that as illustrated in FIG. 7B, the total award provided to the player for the selected game was $16.50. Thus, in exchange for the player's 1500 redeemed equalizing units, the gaming system provided the player a game which resulted in a total award of $16.50.

In different embodiments, the games a player may redeem their equalizing units for includes, but is not limited to:

(i) one or more activations or plays of a game of choice, (ii) one or more activations or plays of a generic game, (iii) one or more activations or plays of the player's current game, (iv) one or more activations or plays of a primary game, (v) one or more activations or plays of a bonus game, (vi) one or more activations or plays of a selection game.

(vii) one or more activations or plays of an offer and acceptance type game, (viii) one or more activations or plays of an advancement game, (ix) one or more activations or plays of a competition type game.

(x) one or more activations or plays of an elimination style game, (xi) one or more activations or plays of a path game, (xii) one or more activations or plays of a skill game, (xiii) one or more activations or plays of a perceived skill game, (xiv) one or more activations of an instant win bonus game, (xv) one or more activations of a convert to cash bonus game, (xvi) one or more activations or plays of a slot game, (xvii) one or more activations or plays of a poker game, (xviii) one or more activations or plays of a blackjack game, (xix) one or more activations or plays of a wheel game, (xx) one or more activations or plays of a game incorporating a physical device, (xxi) one or more activations or plays of a game incorporating a non-physical device, (xxii) one or more activations or plays of a group game or event, (xxiii) one or more activations or plays of a promotional game or event, (xxiv) one or more activations or plays of a bingo game, (xxv) one or more activations or plays of an auction event, (xxvi) one or more activations or plays of a video game, (xxvii) one or more activations or plays of a game at a gaming table, (xxviii) one or more activations or plays of a tournament game, (xxix) one or more drawing tickets, (xxx) one or more modifiers of one or more game, (xxxi) any game disclosed herein, (xxxii) one or more free activations or plays of any game disclosed herein.

(xxxiii) any combination thereof, or (xxxiv) any other type of game defined or desired by the gaming system operator.

In one embodiment, the game program of a gaming device in the gaming system includes a library of one or more of the games which a player may play in exchange for a quantity of accumulated equalizing units. In another embodiment, a library of one or more of the games which a player may play in exchange for a quantity of accumulated equalizing units is communicated from the central server.

In one example of the gaming system disclosed herein, a gold level player at a gaming device with an average expected payback percentage of 85% (which provides a player 10 equalizing units for every $10 wagered as described above) deposits $100 into the gaming device. After playing for a designated amount of time and wagering a total of $350 at the gaming device, the player's credit meter is at $180. In addition to the $80 win from the player's game play at the gaming device, the central server determines that the $350 wagered includes 35 equalizing unit accumulation events of $10 wagered and as each equalizing unit for this gaming device results in the gaming system providing 10 equalizing units, the central server determines a total of 350 equalizing units. Moreover, as a gold level player in this example is provided equalizing units at a greater rate than non-carded players or lower player tracking level players, the central server modifies the determined 350 equalizing units by a factor of 1.5 associated with the gold level player tracking status to result in a modified total of 525 equalizing units provided to the player.

In this example, if the player decides to redeem their 525 accumulated equalizing units, the central server determines which games the player may play in exchange for their accumulated equalizing units. As described above, this determination is based on the value of each equalizing unit and the average expected payout of each available game. The gaming device enables the player to select one of the determined games to play and provides the player one or more plays of the selected game. In this example, the play of the player's selected game results in an award of $120 provided to the player. Thus, for the player's gaming session, the $80 win from the player's base game play is combined with the $120 win from the player's redeemed game play (i.e., which is made possible from the 525 equalizing units provided in association with the player's base game play) to result in a total win of $200 for the player.

In another embodiment, the gaming system enables a player to redeem any accumulated equalizing units for one or more non-game prizes, such as merchandise, meals, expiring inventory, or any other offer deemed appropriate by the gaming system operator. In one such embodiment, the gaming system includes a catalogue of non-game prizes wherein different prizes are associated with different quantities of equalizing units. In another such embodiment, the gaming system enables a player to redeem any accumulated equalizing units for discounts on one or more non-game prizes. In one such embodiment wherein expiring inventory is provided to players in exchange for redeemed equalizing units, the gaming establishment determines the cost of equalizing units for such expiring inventory on a sliding scale. For example, if a show is at 7:00 PM, empty seats may be offered for 10,000 equalizing units at 8:00 AM and then again for 5,000 equalizing units at 5:00 PM.

In another embodiment, the gaming system enables a player to redeem any accumulated equalizing units in an auction format. In one such embodiment, the gaming system enables a player utilize their accumulated equalizing units to bid for one or more plays of one or more games as disclosed herein. In another such embodiment, the gaming system enables a player utilize their accumulated equalizing units to bid for one or more non-game prizes.

In another embodiment, the gaming system enables a plurality of players to accumulate and redeem equalizing units as a group. In one embodiment, the central server determines one or more groups of gaming devices or groups of players. In another embodiment, the gaming system operator determines one or more groups of gaming devices or groups of players. In another embodiment, the gaming system enables one or more players to input or otherwise communicate to the gaming system a list of other players to form a group. In different embodiments, one or more formed groups are determined based on a type of gaming device, determined based on a game theme, predetermined, randomly determined, determined based on a generated symbol or symbol combination, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In one embodiment, if the gaming system determines to provide one or more equalizing units to a designated player in a group (i.e., the occurrence of an equalizing unit accumulation event), at least one, a plurality of or each of the other players included in the designated player's group are provided one or more equalizing units. In one such embodiment, the equalizing units to be provided to the designated player are split or shared amongst the players in the designated player's group. In another such embodiment, one or more of the players in the designated player's group are provided the same quantity of equalizing units which the designated player would have received individually. In another such embodiment, the designated player is provided the same quantity of equalizing units which they would have received individually and one or more of the remaining players in the designated player's group are provided a different quantity of equalizing units.

In another embodiment, if a designated player in a group of players redeems their accumulated equalizing units in exchange for a play of a game (i.e., the occurrence of an equalizing unit redemption event), at least one, a plurality of or each of the other players included in the designated player's group are provided at least one play of the redeemed game. In one such embodiment, each player in the group that is provided at least one play of the redeemed game utilizing the same parameters as the designated player's redeemed game. In another such embodiment, each player in the group that is provided at least one play of the redeemed game utilizing the parameters specific to that player's gaming device or alternatively a generic gaming device.

In another embodiment, upon the occurrence of an equalizing unit accumulation event, the group of players is provided a quantity of equalizing units as a separate entity. In this embodiment, the group of players is enabled to redeem the equalizing units for one or more plays of one or more games, wherein any awards provided for the redeemed games are distributed amongst the players in the group. In different embodiments, the distribution of such awards is determined based on a type of gaming device, determined based on a game theme, predetermined, randomly determined, determined based on a generated symbol or symbol combination, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In another embodiment, the gaming system enables a plurality of players to accumulate equalizing units individually and redeem their accumulated equalizing units as a group. In another embodiment, the gaming system enables a plurality of players to accumulate equalizing units as a group and redeem their accumulated equalizing units individually.

In another embodiment, the gaming system enables a player to redeem any accumulated equalizing units for a modification to one or more aspects of a primary game. In this embodiment, if the player selects to cause an equalizing unit redemption event to occur, the gaming system enables the player to selectively utilize their accumulated equalizing units to determine which aspects of one or more primary games to change and when these changed aspects are to be implemented. In different embodiments, in exchange for a quantity of equalizing units, for a designated number of games or a designated period of time, the gaming device modifies the bet configuration of a game, the denomination of a game, the applicable modifier for a game, the number of occurrences of certain symbols in the game, the payout associated with certain symbols in the game, the features associated with certain symbols in the game, and/or the bonus event associated with the game.

In one embodiment, the gaming system determines whether or not to enable the player to redeem any accumulated equalizing units for a play of one or more games based on if at least one redemption condition is satisfied. In one such embodiment, the redemption condition is the player playing a designated number of games played during the current gaming session. In different embodiments, the redemption condition that must be reached to enable the player to redeem any accumulated equalizing units for a play of one or more games is predetermined, randomly determined, determined based on a random determination by the central controller, determined based on a random determination by one or more gaming devices, determined based on the status of one or more players (such as determined through a player tracking system), determined based on a generated symbol or symbol combination, determined based on one or more side wagers placed, determined based on a player's primary game wager, determined based on the amount of coin-in accumulated in one or more pools, or determined based on any other suitable method or criteria.

It should be appreciated that in one alternative embodiment, the manner of equalizing different gaming devices in the gaming system disclosed herein is utilized to determine quantities of player tracking points to provide to players at different gaming devices in the gaming system. In this embodiment, one or more features of the equalizing units disclosed herein are applicable for player tracking points implemented in a player tracking system.

In another embodiment of equalizing a plurality of gaming devices in the gaming system, prior to the triggering a bonus event, the central controller determines one or more characteristics of the gaming device or of the player at the gaming device. Accounting for this information, the central controller determines a bonus event to provide to the player. For example, upon a determination to provide a bonus award to a player, if the player is at a first gaming device with a first average expected payout, the player is provided a first bonus event, however if the player is at a second gaming device with a second, different average expected payout, the player is provided a different second bonus event.

In another embodiment of providing a feature which integrates the different gaming machines of the gaming system, all of the base games of the different gaming machines are set to a certain default payback percentage defined by their respective paytables. In this embodiment, based on one or more criteria, such as a redemption for a quantity of equalizing units or the determination to normalize different gaming devices in the gaming system, the gaming system modifies the payback percentage for a game at a gaming device. In one embodiment, if no equalizing units are redeemed, a game is played, but no additional features will be applied to the game. For example, if the game is a free spin bonus game of 10 spins, the player will receive their free spins and the bonus game will commence. However, if a designated quantity of equalizing units are redeemed, the gaming system determines that the player is to receive an additional payback percentage to bring the game to a designated payback percentage. In this embodiment, the gaming system provides one or more additional features in the game to modify the payback percentage. For example, the gaming system provides the player a set number of additional free spins that equate to the payback percentage difference (between the current base game payback percentage and the designated payback percentage). Alternatively, the gaming system provides the player multiplied outcomes to make up the difference between the current base game payback percentage and the designated payback percentage.

In another embodiment of equalizing different gaming devices in the gaming system, all of the base games at a plurality of gaming devices are set to a certain default payback percentage defined by their paytables. In this embodiment, the gaming system operator determines that the average expected payback percentage for certain designated players, such as Gold level players and above, be set to 95%. In this embodiment, if a bonus event is triggered and the player is un-carded, the bonus will be played, but no additional features will be applied to the game. For example, if the game is a free spin bonus game of 10 spins, the player will receive their free spins and the bonus game will commence. However, if the player is at or above the designated player tracking level status, the gaming system determines that the player is to receive an additional payback percentage to bring the game to a designated payback percentage. In this embodiment, the gaming system provides one or more additional features in the game to modify the payback percentage. For example, the gaming system provides the player a set number of additional free spins that equate to the payback percentage difference (between the current base game payback percentage and the designated payback percentage). Alternatively, the gaming system provides the player multiplied outcomes to make up the difference between the current base game payback percentage and the designated payback percentage.

In one embodiment of equalizing bonus events for different gaming devices in the gaming system, the gaming devices utilize their own themes, symbols, volatility, math, and other features. In this embodiment, as the bonus event must be approved by the central controller, upon a triggering of each bonus event, the gaming device communicates with the central controller regarding the triggering bonus event and one or more aspects of the gaming device. However, to work across each of the potential thousands of different gaming devices in the gaming system, each gaming device utilizes an algorithm that normalizes how the bonus event is applied. In other words, the gaming device needs to know what type of game it is and thus what type of bonus event it needs to apply. Accordingly, in one embodiment, upon a bonus event triggering, the gaming device communicates a message to the central controller that essentially says "I am game type X, I need outcome Y". In another embodiment, the central controller determines what type of outcome is needed based on the game type information sent.

In one embodiment, the central controller includes a number of different possible responses based on the game type. These possible responses can be stored in a table that the central controller is operable to access to determine what it does next. In one embodiment, the table is partitioned into different sectors based on the different game or gaming device types. For example, the table sector X corresponds to game type X and provides a number of different outcomes that can be provided to game type X in a bonus event. The sector Y corresponds to game type Y and provides a number of different outcomes that can be provided to game type Y in a bonus event. Even if game type X and game type Y are two totally different game types (such as in terms of bonus hit frequency) the outcomes returned to them by the central controller will equalize their payouts so both are increased by the proper payback percentage amount over time regardless of their different characteristics.

In one example embodiment, a fixed amount of outcomes in a game's list of possible outcomes have been predefined as "bonus" outcomes. These outcomes also have a predetermined value, but that value is augmented by the level of the player at the gaming device (to increase the payback percentage as desired by the operator). For example, the predetermined values are low, medium or high, wherein: (i) gaming device A has been defined to have 4 low value bonus events, (ii) gaming device B has been defined to have 1 high value bonus event and 1 medium value bonus event, and (iii) gaming device C has been defined to have 3 medium value bonus events. Each of these bonus events have a look and play style that is unique to that gaming device, but the average expected payback percentage of the outcomes are predefined by which value range they are in. In this example embodiment, when the game results in one of these outcomes, the gaming device communicates with the central controller regarding what to do to the bonus value (in order to add to the payback percentage for the specific players designated by the gaming establishment.)

For example, if the central controller receives data from gaming device A that a low value bonus event has hit and that the player at gaming device A is a Platinum player (i.e., a level above the designated player tracking level status), the central controller determines that the low value bonus are heavily modified for Platinum players. In this example, the central controller communicates data to gaming device A to apply a multiplier of 10× to the bonus value which gaming device A determines. In another example, if the central controller receives data from gaming device B that a high value bonus event has hit and that the player at gaming device B is a Gold player (i.e., a level above the designated player tracking level status), the central controller determines that the high value bonus are slightly modified for Gold players. In this example, the central controller communicates data to gaming device B to apply a multiplier of 5× to the bonus value which gaming device B determines. In another example, if the central controller receives data from gaming device C that a medium value bonus event has hit and that the player at gaming device C is an un-carded player (i.e., a level below the designated player tracking level status), the central controller determines that the medium value bonus are not modified for un-carded players. In this example, the central controller communicates data to gaming device C to apply no multiplier to the bonus value which gaming device C determines. It should be appreciated that in these embodiments, the modification to the bonus events include, but are not limited to, an increased quantity of spins or activations of a game, utilizing a pool of higher values to pick from, a increased quantity of player picks, a decreased quantity of terminators, a multiplier, any suitable feature disclosed herein or any additional feature desired by the gaming system operator.

Information Provided to Player

As indicated above, the occurrence of an equalizing unit accumulation event may occur with or without explanation or information provided to the player, or alternatively information can be displayed to the player. In one embodiment, suitable information about the equalizing unit accumulation event can be provided to the players through one or more displays on the gaming machines or additional information displays positioned near the gaming machines, such as above a bank of system gaming machines. In one embodiment, a metering and/or information display device may be used to display information regarding the equalizing unit accumulation events. This information can be used to entertain the player or inform the player that an equalizing unit accumulation event has occurred or will occur. Examples of such information are:

(1) that an equalizing unit accumulation event has occurred;

(2) that an equalizing unit accumulation event will shortly occur (i.e., foreshadowing the providing of a quantity of equalizing units);

(3) that one or more equalizing units have been provided to one or more players of the system gaming machines;

(4) which players have accumulated equalizing units;

(5) the amount of the equalizing units accumulated;

(6) the highest quantity of equalizing units accumulated;

(7) the lowest quantity of equalizing units accumulated;

(8) the average quantity of equalizing units accumulated;

(9) number of games played/total time since the last equalizing unit accumulation event has occurred;

(10) the number of equalizing units accumulated in a designated time period;

(11) an average amount of time between each equalizing unit accumulation event occurring;

(12) that an equalizing unit redemption event has occurred;

(13) that an equalizing unit redemption event will shortly occur (i.e., foreshadowing the providing of a bonus award in a redeemed bonus game);

(14) an award provided in association with an equalizing unit redemption event;

(15) which players have won awards in association with an equalizing unit redemption event;

(16) the amount of the awards won in association with an equalizing unit redemption event;

(17) the highest award won in association with an equalizing unit redemption event;

(18) the average award won in association with an equalizing unit redemption event; and

(19) an average amount of time between each equalizing unit redemption event occurring.

It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a controller;

a first gaming device configured to communicate with the controller, said first gaming device including:

at least one first gaming device display device, a plurality of first gaming device input devices including a first gaming device acceptor, and a first gaming device cashout device, at least one first gaming device processor, and at least one first gaming device memory device which stores a plurality of instructions, which when executed by the at least one first gaming device processor, cause the at least one first gaming device processor to operate with the at least one first gaming device display device and the plurality of first gaming device input devices to:

(i) if a first physical item is received via the first gaming device acceptor, establish a first credit balance based, at least in part, on a first monetary value associated with the received first physical item, (ii) display a first primary game upon placement of a wager, wherein said first primary game is associated with a first average expected payback percentage, and (iii) if a first cashout input is received via the first gaming device cashout device, cause an initiation of any payout associated with the first credit balance; and a second gaming device configured to communicate with the controller, said second gaming device including:

at least one second gaming device display device, a plurality of second gaming device input devices including a second gaming device acceptor and a second gaming device cashout device, at least one second gaming device processor, and at least one second gaming device memory device which stores a plurality of instructions, which when executed by the at least one second gaming device processor, cause the at least one second gaming device processor to operate with the at least one second gaming device display device and the plurality of second gaming device input devices to:

(i) if a second physical item is received via the second gaming device acceptor, establish a second credit balance based, at least in part, on a second monetary value associated with the received second physical item, (ii) display a primary game upon placement of a wager, wherein said second primary game is associated with a second, different average expected payback percentage, and (iii) if a second cashout input is received via the second gaming device cashout device, cause an initiation of any payout associated with the second credit balance;

wherein upon an occurrence of an equalizing unit accumulation event, if a player is placing a first wager amount to play the first gaming device, said controller is configured to:

(a) determine a first quantity of equalizing units to accumulate, wherein said equalizing units are independent of any wagered credits, independent of any promotional credits and independent of any player tracking points, and said first quantity of equalizing units is based, at least in part, on the first average expected payback percentage associated with the primary game of the first gaming device, and (b) communicate information based on the determined first quantity of equalizing units to the first gaming device, wherein the determined first quantity of equalizing units is displayable; and wherein upon the occurrence of the equalizing unit accumulation event, if the player is placing the first wager amount to play the second gaming device, said controller is configured to:

(i) determine a second, different quantity of equalizing units to accumulate, wherein said second quantity of equalizing units is based, at least in part, on the second average expected payback percentage associated with the second primary game of the second gaming device, and (ii) communicate information based on the determined second quantity of equalizing units to the second gaming device, wherein the determined second quantity of equalizing units is displayable.

2. The gaming system of claim 1, wherein the equalizing unit accumulation event occurs based on at least one selected from the group consisting of an amount of wagers placed, an amount of awards provided, a generation of a symbol, a quantity of primary games played, an amount of time of game play, an occurrence of a designated threshold reached, a wager level, a length of time, a length of time after a designated amount is wagered, and a number of active gaming devices.

3. The gaming system of claim 1, wherein the quantity of equalizing units to accumulate is based on at least one selected from the group consisting of: an amount of wagers placed, an amount of awards provided, a generation of a symbol, a quantity of primary games played, an amount of time of game play, an occurrence of a designated threshold reached, a wager level, a length of time, a length of time after a designated amount is wagered, and a number of active gaming devices.

4. The gaming system of claim 1, wherein the equalizing unit accumulation event occurs independent of any displayed events in any plays of said primary games.

5. The gaming system of claim 1, wherein the quantity of equalizing units to accumulate is based on player tracking information.

6. The gaming system of claim 1, wherein different quantities of equalizing units are redeemable for different award opportunities.

7. The gaming system of claim 6, wherein:

a first award opportunity is associated with a first average expected payout said first award opportunity associated with a first quantity of equalizing units required to be redeemed in exchange for a play of said first award opportunity, wherein said first quantity of equalizing units is based on the first average expected payout and at least part of the first quantity of equalizing units are accumulated independent of any outcome generated in any game played, and a second award opportunity game is associated with a second average expected payout, said second award opportunity associated with a second quantity of equalizing units required to be redeemed in exchange for a play of said second award opportunity, wherein said second quantity of equalizing units is based on the second average expected payout and at least part of the second quantity of equalizing units are accumulated independent of any outcome generated in any game played.

8. A gaming system comprising:

a controller; and at least one gaming device configured to communicate with the controller, said at least one gaming device including:

a plurality of input devices including an acceptor and a cashout device, at least one display device, at least one processor, and at least one memory device which stores a plurality of instructions, which when executed by the at least one processor, cause the at least one processor to operate with the at least one display device and the plurality of input devices to (a) if a physical item is received via the acceptor, establish a credit balance based, at least in part, on a monetary value associated with the received physical item, (b) display a first game associated with a first average expected payout, said first game associated with a first quantity of equalizing units required to be redeemed in exchange for a play of said first game, wherein said equalizing units are independent of any wagered credits, independent of any promotional credits and independent of any player tracking points and said first quantity of equalizing units is based on the first average expected payout and at least part of the first quantity of equalizing units are accumulated independent of any outcome generated in any game played, (c) display a second game associated with a second average expected payout, said second game associated with a second quantity of equalizing units required to be redeemed in exchange for a play of said second game, wherein said second quantity of equalizing units is based on the second average expected payout and at least part of the second quantity of equalizing units are accumulated independent of any outcome generated in any game played, and (d) if a cashout input is received via the cashout device, cause an initiation of any payout associated with the credit balance.

9. The gaming system of claim 8, wherein the first game and the second game have the save average expected payouts.

10. The gaming system of claim 8, wherein a configuration of the first game is identical to a configuration of the second game.

11. The gaming system of claim 8, the first game and the second game have different average expected payouts such that the quantity of equalizing units required to be redeemed in exchange for the play of said first game is different than the quantity of equalizing units required to be redeemed in exchange for the play of said second game.

12. The gaming system of claim 8, wherein the average expected payout for the first game is based, at least in part, on a wager placed on the first game and an average expected payback percentage associated with the first game.

13. The gaming system of claim 8, wherein the average expected payout for the second game is based, at least in part, on a wager placed on the second game and an average expected payback percentage associated with the second game.

14. The gaming system of claim 8, wherein said equalizing units are accumulated upon an occurrence of an equalizing unit accumulation event.

15. The gaming system of claim 14, wherein the equalizing unit accumulation event occurs based on at least one selected from the group consisting of: at an amount of wagers placed, an amount of awards provided, a generation of a symbol, a quantity of primary games played, an amount of time of game play, an occurrence of a designated threshold reached, a wager level, a length of time, a length of time after a designated amount is wagered, and a number of active gaming devices.

16. The gaming system of claim 14, wherein when executed by the at least one processor upon the occurrence of the equalizing unit accumulation event, the plurality of instructions cause the at least one processor to determine a quantity of equalizing units to accumulate for a player, wherein the determined quantity of equalizing units is based on an amount of credits wagered and an average expected payback percentage such that a same designated amount of credits wagered results in two different quantities of equalizing units to accumulate when two average expected payout percentages are different.

17. A gaming system comprising:

a plurality of input devices including an acceptor and a cashout device;

at least one display device configured to at least display:

(i) a first game associated with a first average expected payout, said first game associated with a first quantity of equalizing units required to play said first game, wherein said equalizing units are independent of any wagered credits, independent of any promotional credits and independent of any player tracking points and said first quantity of equalizing units is based on the first average expected payout, and (ii) a second game associated with a second average expected payout, said second game associated with a second quantity of equalizing units required to play said second game, wherein said second quantity of equalizing units is based on the second average expected payout; and at least one memory device which stores a plurality of instructions which when executed by at least one processor cause the at least one processor to operate with the plurality of input devices and the at least one display device to:

(a) if a physical item is received via the acceptor, establish a credit balance based, at least in part, on a monetary value associated with the received physical item, (b) display the first quantity of equalizing units required for a play of the first game and the second quantity of equalizing units required for a play of the second game, (c) if a quantity of accumulated equalizing units is greater than the first quantity of equalizing units:

(i) enable a player to redeem the first quantity of equalizing units in exchange for the play of the first game, and (ii) if the player redeems the first quantity of equalizing units:

(A) deduct the first quantity of equalizing units from the accumulated quantity of equalizing units, and (B) provide the player any award in association with the play of the first game, (d) if the accumulated quantity of equalizing units is greater than the second quantity of equalizing units:

(i) enable the player to redeem the second quantity of equalizing units in exchange for the play of the second game, and (ii) if the player redeems the second quantity of equalizing units:

(A) deduct the second quantity of equalizing units from the quantity of accumulated equalizing units, and (B) provide the player any award in association with the play of the second game, and (e) if a cashout input is received via the cashout device, cause an initiation of any payout associated with the credit balance.

18. The gaming system of claim 17, wherein the first game and the second game have the save average expected payouts.

19. The gaming system of claim 17, wherein a configuration of the first game is identical to a configuration of the second game.

20. The gaming system of claim 17, the first game and the second game have different average expected payouts such that the quantity of equalizing units required to be redeemed in exchange for the play of said first game is different than the quantity of equalizing units required to be redeemed in exchange for the play of said second game.

21. The gaming system of claim 17, wherein the average expected payout for the first game is based, at least in part, on a wager placed on the first game and an average expected payback percentage associated with the first game.

22. The gaming system of claim 17, wherein the average expected payout for the second game is based, at least in part, on a wager placed on the second game and an average expected payback percentage associated with the second game.

23. The gaming system of claim 17, wherein the quantity of accumulated equalizing units is based on player tracking information.

24. The gaming system of claim 23, wherein the quantity of accumulated equalizing units is based on at least one selected from the group consisting of: an amount of wagers placed, an amount of awards provided, a generation of a symbol, a quantity of primary games played, an amount of time of game play, an occurrence of a designated threshold reached, a wager level, a length of time, a length of time after a designated amount is wagered, and a number of active gaming devices.

25. The gaming system of claim 17, wherein said equalizing units are accumulated upon an occurrence of an equalizing unit accumulation event.

26. The gaming system of claim 25, wherein the equalizing unit accumulation event occurs based on at least one selected from the group consisting of: an amount of wagers placed, an amount of awards provided, a generation of a symbol, a quantity of primary games played, an amount of time of game play, an occurrence of a designated threshold reached, a wager level, a length of time, a length of time after a designated amount is wagered, and a number of active gaming devices.

27. The gaming system of claim 25, wherein when executed by the at least one processor upon the occurrence of the equalizing unit accumulation event, the plurality of instructions cause the at least one processor to determine a quantity of equalizing units to accumulate for the player, wherein the determined quantity of equalizing units is based on an amount of credits wagered and an average expected payback percentage such that a same designated amount of credits wagered results in two different quantities of equalizing units to accumulate when two average expected payout percentages are different.

28. A gaming system server comprising:

at least one memory device; and at least one processor configured to communicate with each of a plurality of gaming devices, wherein for each of the plurality of gaming devices, said at least one processor is configured to:

(a) receive data based on an identity of a player at said gaming device;

(b) receive data based on an amount of credits wagered by the identified player at said gaming device, wherein a credit balance of said gaming device is decreasable based on the amount of credits wagered by the identified player, said credit balance being increasable via an acceptor of a physical item associated with a monetary value, and said credit balance being decreasable via a cashout device;

(c) determine a quantity of equalizing units to accumulate for the identified player, wherein said equalizing units are independent of said credits wagered, independent of any promotional credits and independent of any player tracking points, and the determined quantity of equalizing units is based on the amount of credits wagered and the average expected payback percentage for said gaming device such that a same designated amount of credits wagered at two of said gaming devices results in two different quantities of equalizing units to accumulate when said two gaming devices are associated with different average expected payout percentages and said accumulated equalizing units are in addition to any credits provided based on any generated outcomes; and (d) communicate data based on the determined quantity of equalizing units to accumulate to said gaming device, wherein said quantity of equalizing units are displayable to the identified player.

29. The gaming system server of claim 28, wherein the quantity of equalizing units to accumulate is determined upon an occurrence of an equalizing unit accumulation event.

30. The gaming system server of claim 29, wherein the equalizing unit accumulation event occurs based on at least one selected from the group consisting of: an amount of credits wagered, an amount of awards provided, a generation of a symbol, a quantity of primary games played, an amount of time of game play, an occurrence of a designated threshold reached, a wager level, a length of time, a length of time after a designated amount is wagered, and a number of active gaming devices.

31. The gaming system server of claim 29, wherein the equalizing unit accumulation event occurs independent of any displayed events in any plays of any primary games.

32. The gaming system server of claim 28, wherein the quantity of equalizing units to accumulate is further based on at least one selected from the group consisting of: an amount of awards provided, a generation of a symbol, a quantity of primary games played, an amount of time of game play, an occurrence of a designated threshold reached, a wager level, a length of time, a length of time after a designated amount is wagered, and a number of active gaming devices.

33. The gaming system server of claim 28, wherein the quantity of equalizing units to accumulate is further based on player tracking information.

34. The gaming system server of claim 28, wherein the at least one processor is configured to determine a quantity of player tracking points to accumulate for the identified player.

35. The gaming system server of claim 34, wherein the at least one processor is configured to communicate data based on the determined quantity of player tracking points to accumulate to said gaming device to display.

36. The gaming system server of claim 34, wherein each player tracking point is accumulated at a designated basis for each credit wagered without regard to an average expected payback percentage for said gaming device.

37. The gaming system server of claim 28, wherein different quantities of equalizing units are redeemable for different award opportunities.

* * * * *